United States Patent
Mogi

(10) Patent No.: US 12,007,538 B2
(45) Date of Patent: Jun. 11, 2024

(54) OPTICAL SYSTEM, IMAGE PICKUP APPARATUS, AND IMAGE PICKUP SYSTEM

(71) Applicant: CANON KABUSHIKI KAISHA, Tokyo (JP)

(72) Inventor: Shuichi Mogi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 294 days.

(21) Appl. No.: 17/032,506

(22) Filed: Sep. 25, 2020

(65) Prior Publication Data
US 2021/0116687 A1   Apr. 22, 2021

(30) Foreign Application Priority Data
Oct. 17, 2019   (JP) ................. 2019-190192

(51) Int. Cl.
*G02B 15/14* (2006.01)
*G02B 3/04* (2006.01)
*G02B 13/18* (2006.01)

(52) U.S. Cl.
CPC ......... *G02B 15/1421* (2019.08); *G02B 13/18* (2013.01); *G02B 3/04* (2013.01)

(58) Field of Classification Search
CPC .............. G02B 13/001; G02B 13/0015; G02B 13/0045; G02B 13/04; G02B 13/18; G02B 15/143103; G02B 15/1421; G02B 9/12; G02B 3/04; G02B 15/145; G02B 15/1451; G02B 15/145107; G02B 15/1461; G02B 15/24; G02B 15/144103;
(Continued)

(56) References Cited

U.S. PATENT DOCUMENTS 5,774,275 A * 6/1998 Hamano ................ G02B 23/14
                                                         359/687
6,433,940 B1 * 8/2002 Hankawa ....... G02B 15/143103
                                                         359/716
(Continued)

FOREIGN PATENT DOCUMENTS

JP   H02-256015 A   10/1990
JP   2000-292700 A  10/2000
(Continued)

OTHER PUBLICATIONS

English translation of WO-2019220615 (2019) (Year: 2019).*
(Continued)

*Primary Examiner* — Thomas K Pham
*Assistant Examiner* — Kuei-Jen L Edenfield
(74) *Attorney, Agent, or Firm* — Carter, DeLuca & Farrell LLP

(57) ABSTRACT

An optical system includes a first lens unit having a positive refractive power disposed closest to an object, a first focus lens unit having a positive refractive power disposed on an image side of the first lens unit, and a second focus lens unit having a negative refractive power disposed on the image side of the first focus lens unit. The first lens unit is fixed during focusing. The first focus lens unit and the second focus lens unit are movable during focusing so that a distance between the first focus lens unit and the second focus lens unit changes. The first lens unit includes a single negative lens disposed closest to the object. A predetermined condition is satisfied.

26 Claims, 11 Drawing Sheets

(58) Field of Classification Search
CPC ........... G02B 15/145103; G02B 15/14; G02B 23/14; G02B 23/145; G02B 13/00; G02B 9/64; G02B 27/0025; G02B 27/64
USPC ....... 359/676, 668, 670, 680, 745, 739, 791, 359/682, 746, 753, 760–770, 823, 740, 359/779

See application file for complete search history.

(56) References Cited

U.S. PATENT DOCUMENTS

| | | | |
|---|---|---|---|
| 9,110,275 | B2 | 8/2015 | Mogi |
| 9,900,514 | B2 | 2/2018 | Mogi |
| 2020/0073096 | A1* | 3/2020 | Nagami ................. G02B 13/04 |
| 2020/0166730 | A1* | 5/2020 | Nagami ................... G02B 9/12 |
| 2020/0278518 | A1* | 9/2020 | Yamada ................... G02B 9/64 |

FOREIGN PATENT DOCUMENTS

| | | |
|---|---|---|
| JP | 2001-305428 A | 10/2001 |
| JP | 2007-065278 A | 3/2007 |
| JP | 2010-091669 A | 4/2010 |
| JP | 2014-21256 A | 2/2014 |
| JP | 2014-149483 A | 8/2014 |
| JP | 2018-005165 A | 1/2018 |
| JP | 2019-066653 A | 4/2019 |
| WO | 2018/135000 A1 | 7/2018 |
| WO | 2019/098110 A1 | 5/2019 |
| WO | WO-2019220615 A1 * | 11/2019 |

OTHER PUBLICATIONS

English translation of WO-2018135000 (2018) (Year: 2018).*
Notice of Reasons for Rejection issued by the Japanese Patent Office on Jun. 27, 2023 in corresponding JP Patent Application No. 2019-190192, with English translation.

* cited by examiner

OPTICAL SYSTEM, IMAGE PICKUP APPARATUS, AND IMAGE PICKUP SYSTEM

BACKGROUND OF THE INVENTION

Field of the Invention

The present invention relates to an optical system, which is suitable for a digital video camera, a digital still camera, a broadcasting camera, a film-based camera, a surveillance camera, and the like.

Description of the Related Art

Recently, an optical system used for an image pickup apparatus has been demanded to have a small focus unit and to satisfactorily correct the chromatic aberration, the curvature of field, etc. during imaging at the shortest distance while increasing an imaging magnification. One known optical system that satisfies these requirements is an optical system that includes, in order from an object side to an image side, a focus lens unit having a positive refractive power and a focus lens unit having a negative refractive power (see PCT International Publications Nos. ("WOs") 2018/135000 and 2019/098110).

The optical system disclosed in WO 2018/135000 has a wide angle of view and can easily provide high-speed focusing. However, the refractive power of the lens unit having the negative refractive power closest to the image plane is too strong, and thus it becomes difficult to secure the telecentricity in a supportable range of an image sensor if the exit pupil position is too close to the image plane.

The optical system of WO 2019/098110 has a high optical performance over a wide range from infinity to the shortest distance. However, as the optical system has a larger diameter, the focus lens unit having a positive refractive power becomes heavier and high-speed focusing becomes difficult.

SUMMARY OF THE INVENTION

The present invention provides an optical system, an image pickup apparatus, and an image pickup system, each of which can satisfactorily correct aberrations over a wide object distance range while making compact a focus unit.

An optical system according to one aspect of the present invention includes a first lens unit having a positive refractive power disposed closest to an object, a first focus lens unit having a positive refractive power disposed on an image side of the first lens unit, and a second focus lens unit having a negative refractive power disposed on the image side of the first focus lens unit. The first lens unit is fixed during focusing. The first focus lens unit and the second focus lens unit are movable during focusing so that a distance between the first focus lens unit and the second focus lens unit changes. The first lens unit includes a single negative lens disposed closest to the object. The following conditional expressions are satisfied:

$$-5.0 < fp2/fn1 < -0.1$$

$$-0.50 < n1gt/fn1 < -0.04$$

where fp2 is a focal length of the first focus lens unit, fn1 is a focal length of the second focus lens unit, and n1gt is a distance on an optical axis from a surface closest to the object of the second focus lens unit to a surface closest to an image plane of the second focus lens unit.

An optical system according to another aspect of the present invention includes a first lens unit having a positive refractive power disposed closest to an object, a first focus lens unit having a positive refractive power disposed on an image side of the first lens unit, and a second focus lens unit having a negative refractive power disposed on the image side of the first focus lens unit. The first lens unit is fixed during focusing. The first focus lens unit and the second focus lens unit are movable during focusing so that a distance between the first focus lens unit and the second focus lens unit changes. The following conditional expression is satisfied:

$$-1.6 < fp2/fn1 < -0.8$$

where fp2 is a focal length of the first focus lens unit, and fn1 is a focal length of the second focus lens unit.

An image pickup apparatus and an image pickup system each having the above optical system also constitutes another aspect of the present invention.

Further features of the present invention will become apparent from the following description of exemplary embodiments with reference to the attached drawings.

DESCRIPTION OF THE EMBODIMENTS

Figure 1:
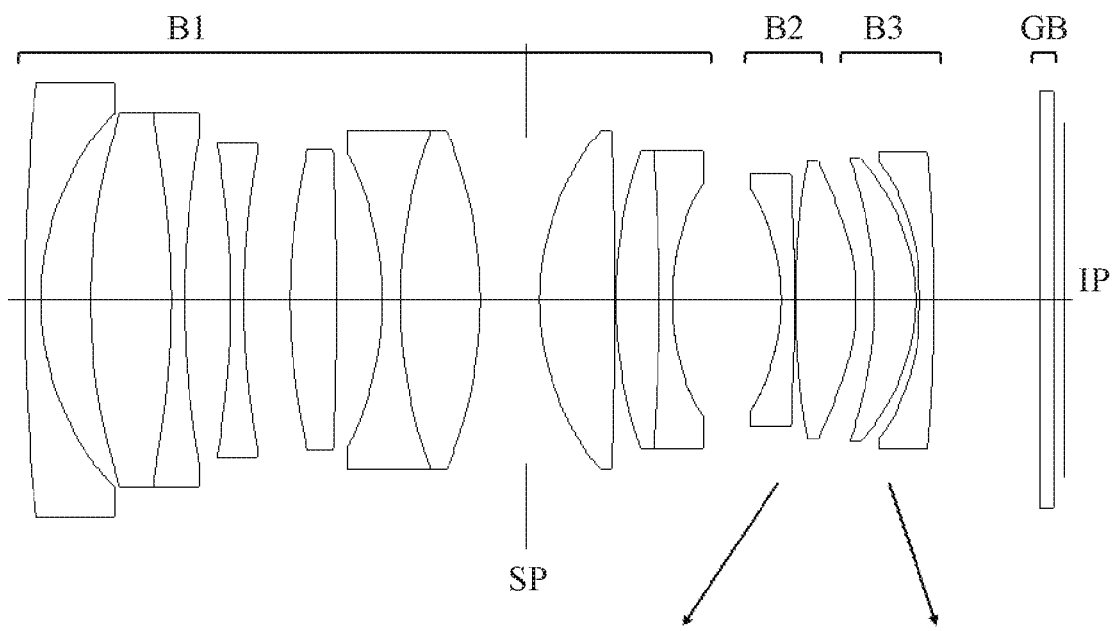
FIG. 1 is a sectional view of an optical system according to Example 1 which is focused on an object at infinity.
Figure 2:
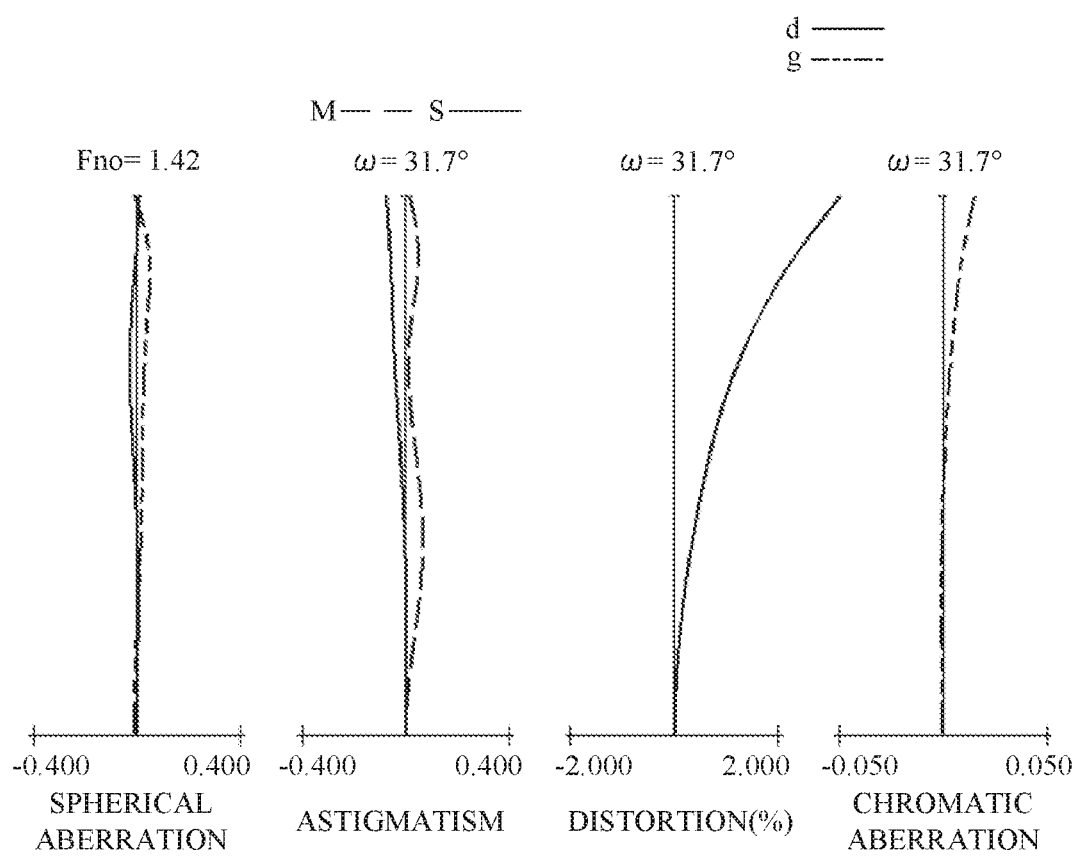
FIG. 2 is an aberrational diagram of the optical system according to Example 1 which is focused on the object at infinity.
Figure 3:
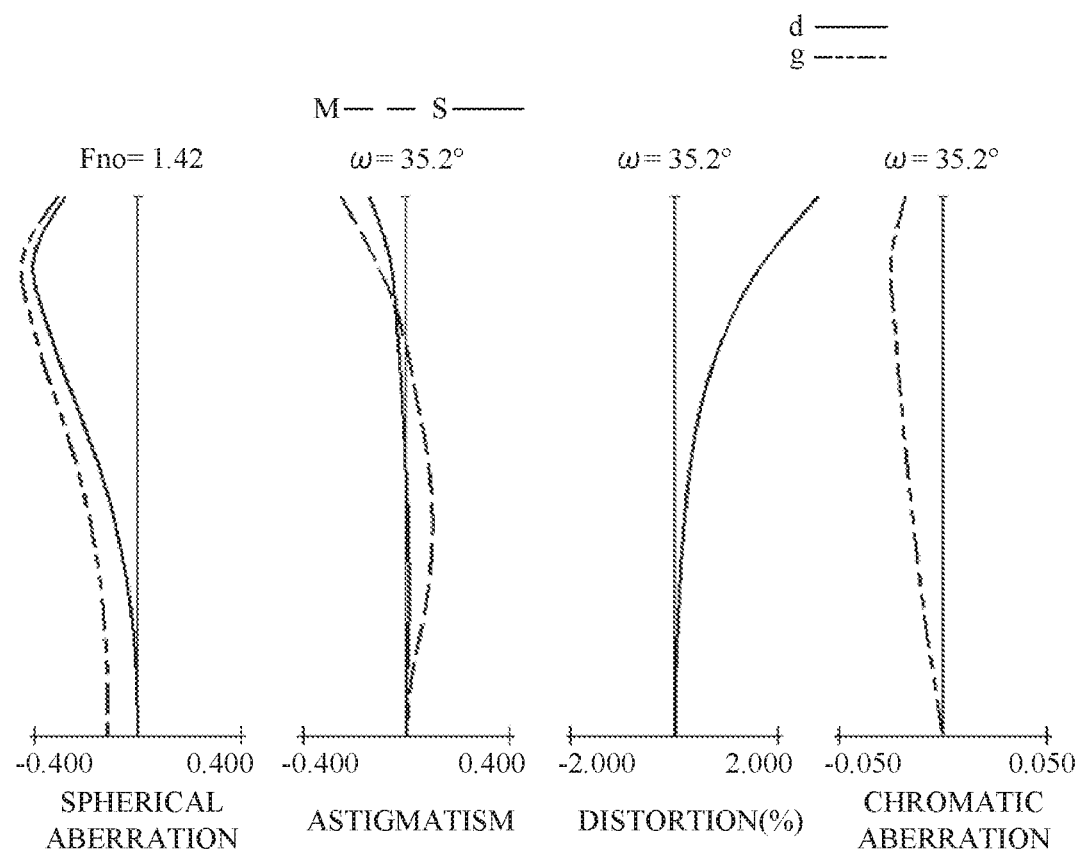
FIG. 3 is an aberrational diagram of the optical system according to Example 1 which is focused on the shortest distance object.
Figure 4:
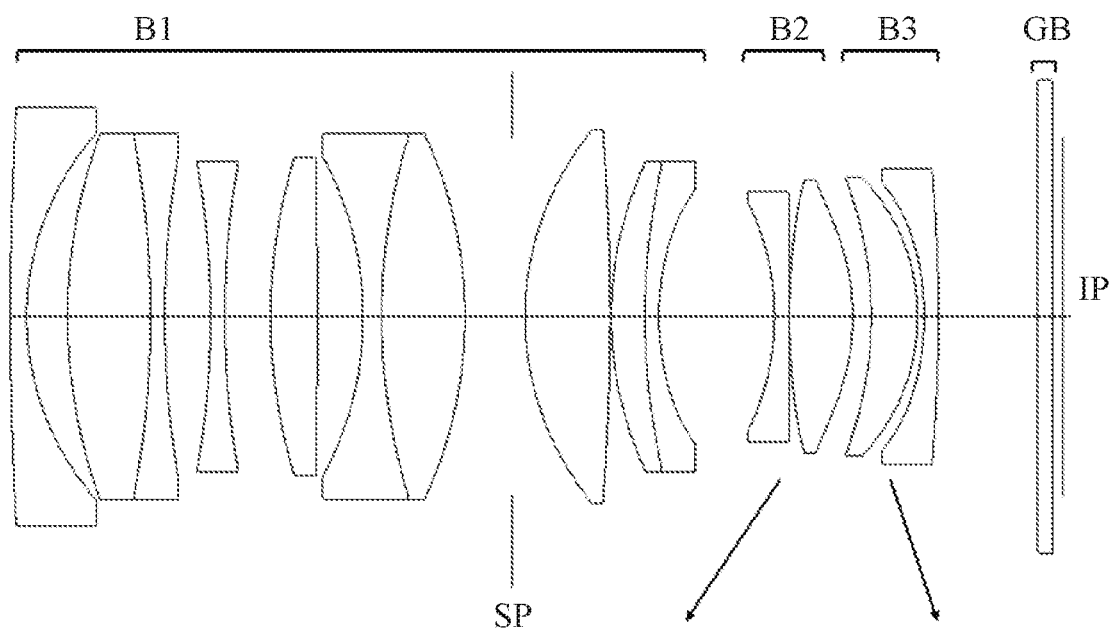
FIG. 4 is a sectional view of an optical system according to Example 2 which is focused on an object at infinity.
Figure 5:
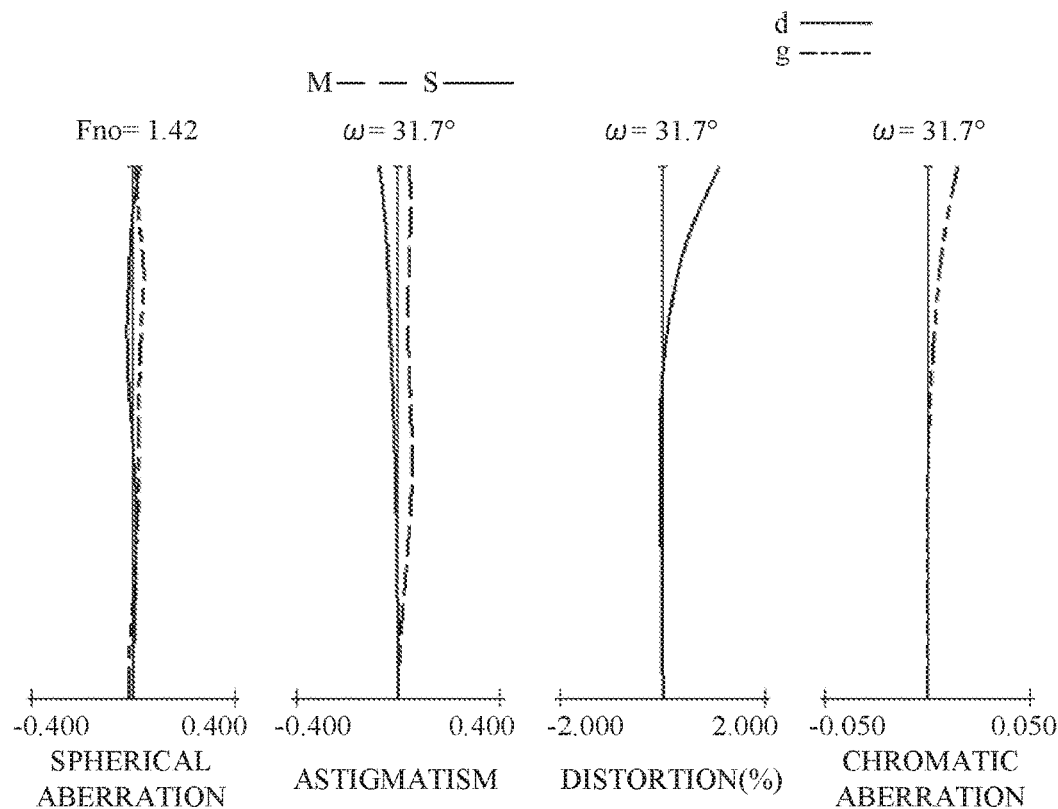
FIG. 5 is an aberrational diagram of the optical system according to Example 2 which is focused on the object at infinity.
Figure 6:
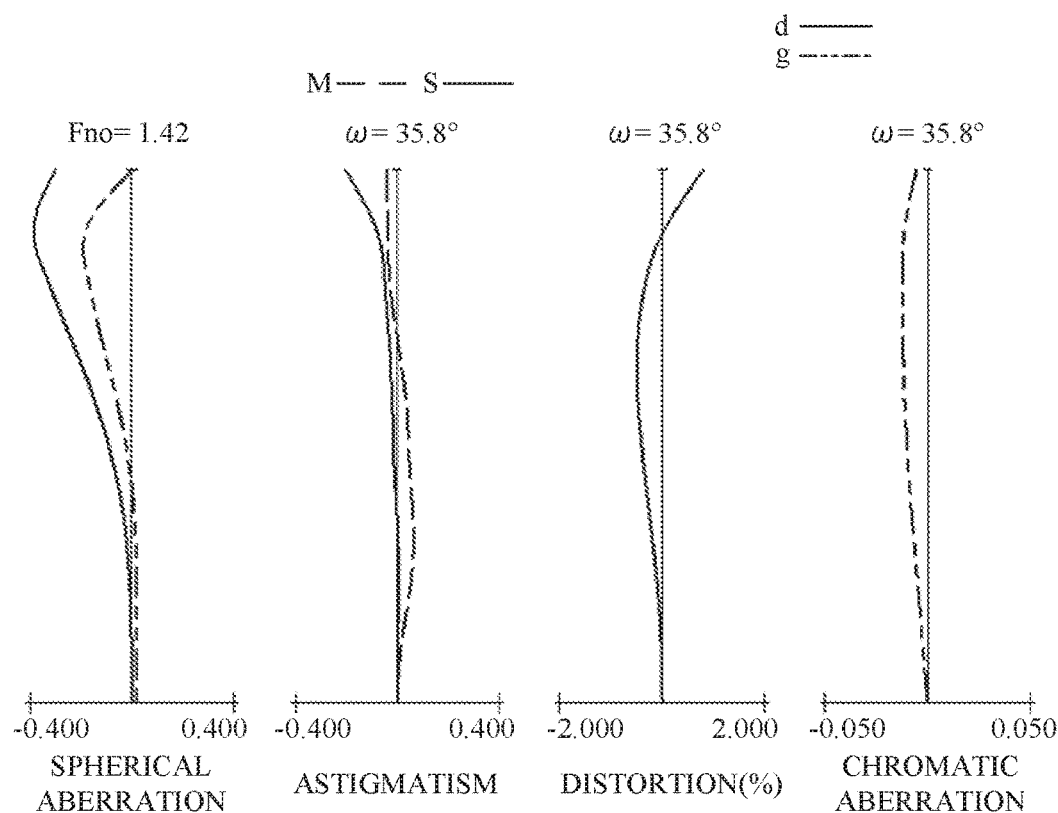
FIG. 6 is an aberrational diagram of the optical system according to Example 2 which is focused on a short distance object.
Figure 7:
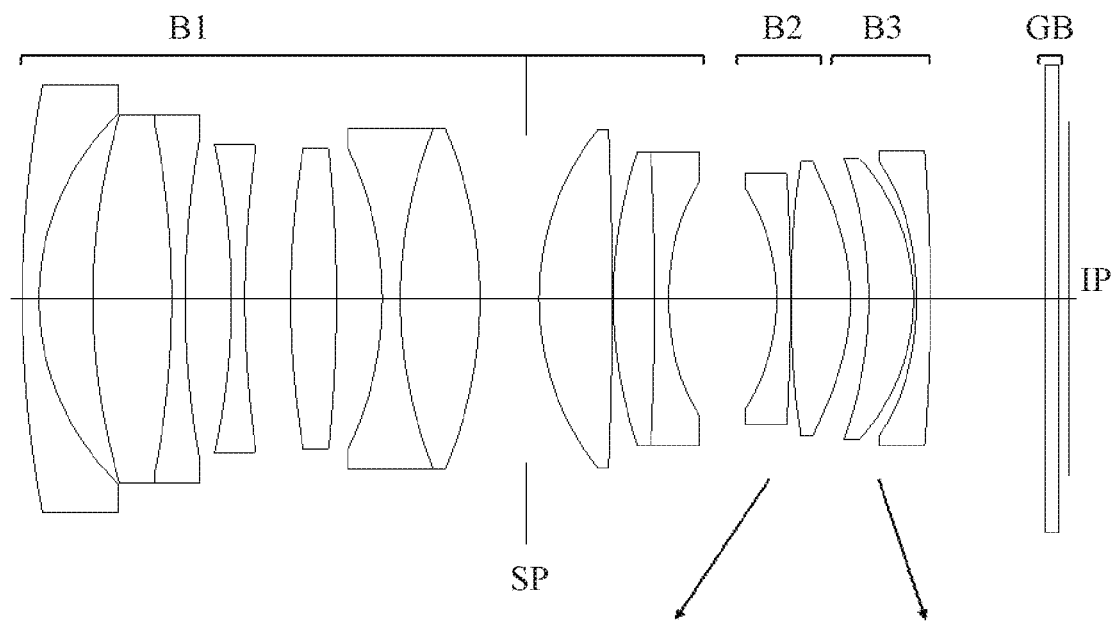
FIG. 7 is a sectional view of an optical system according to Example 3 which is focused on an object at infinity.
Figure 8:
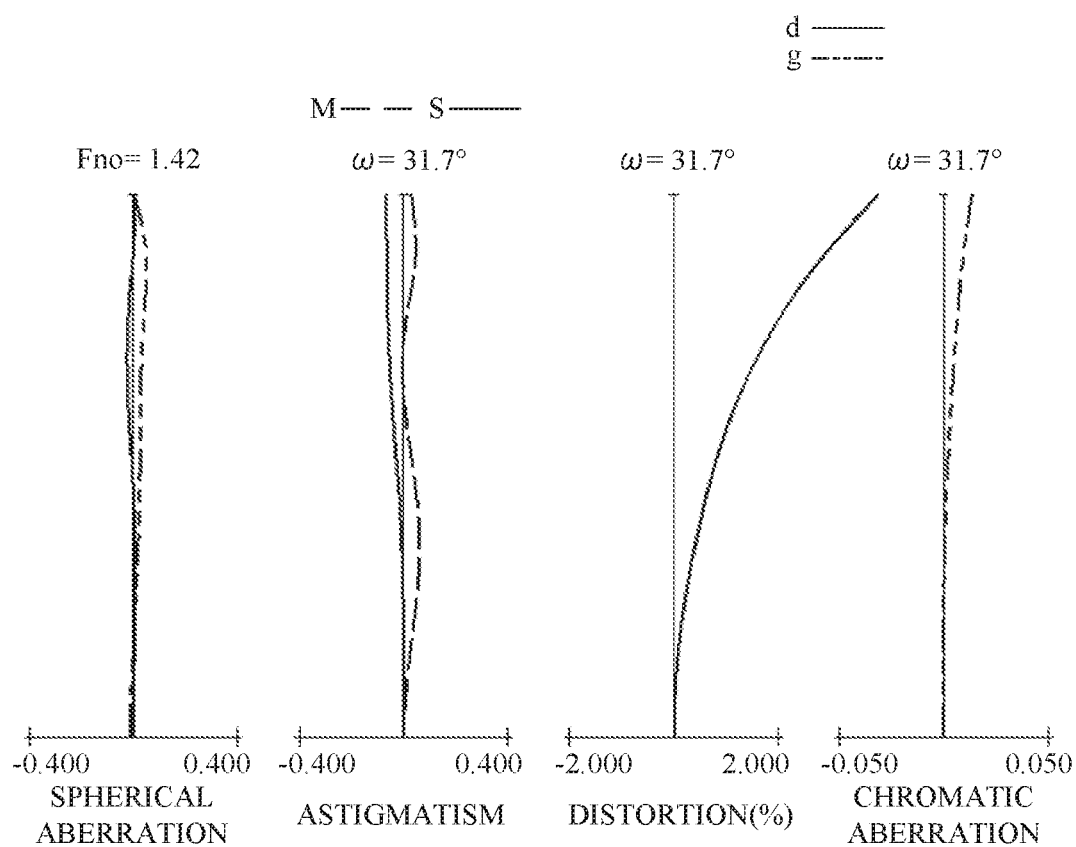
FIG. 8 is an aberrational diagram of the optical system according to Example 3 which is focused on the object at infinity.
Figure 9:
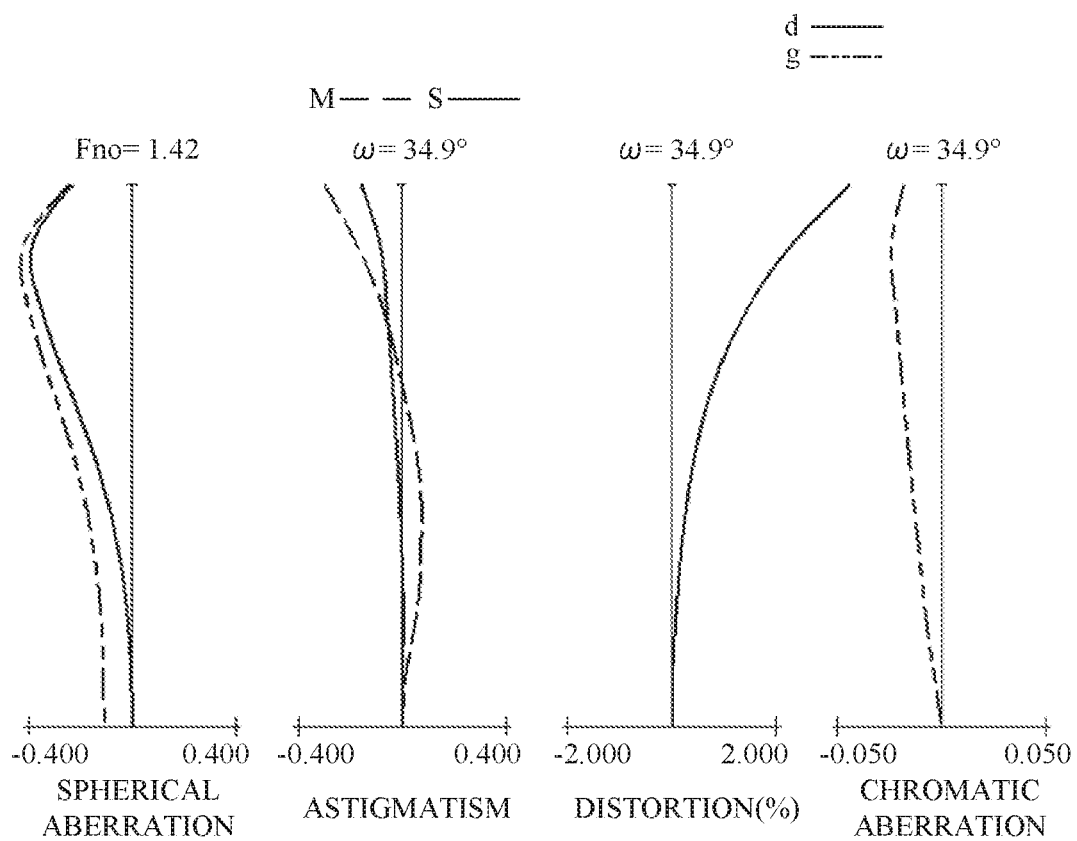
FIG. 9 is an aberrational diagram of the optical system according to Example 3 which is focused on a short distance object.
Figure 10:
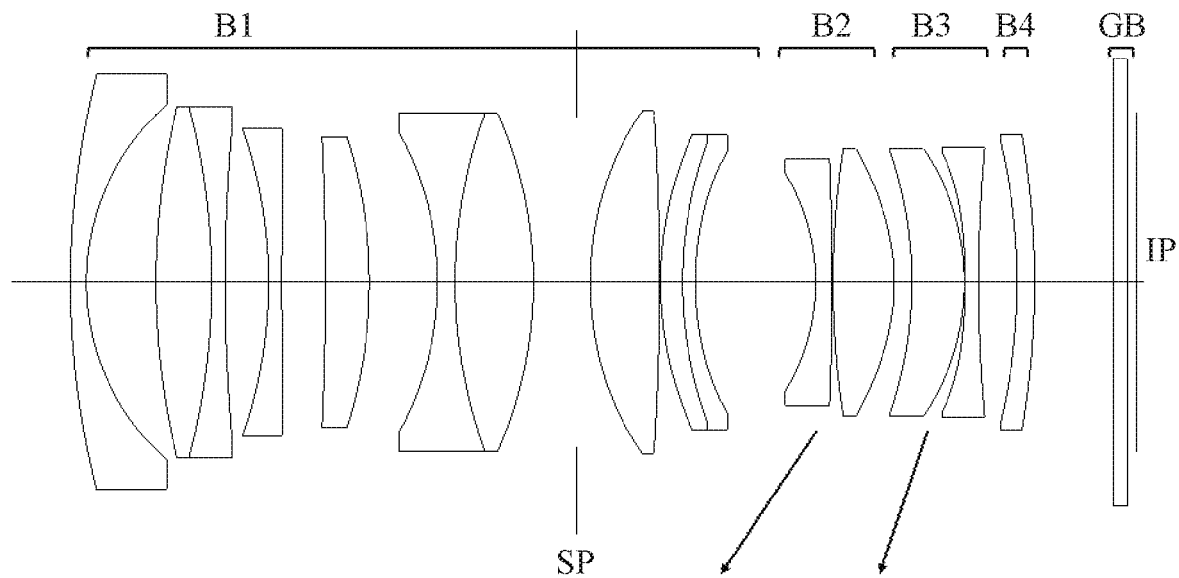
FIG. 10 is a sectional view of an optical system according to Example 4 which is focused on an object at infinity.
Figure 11:
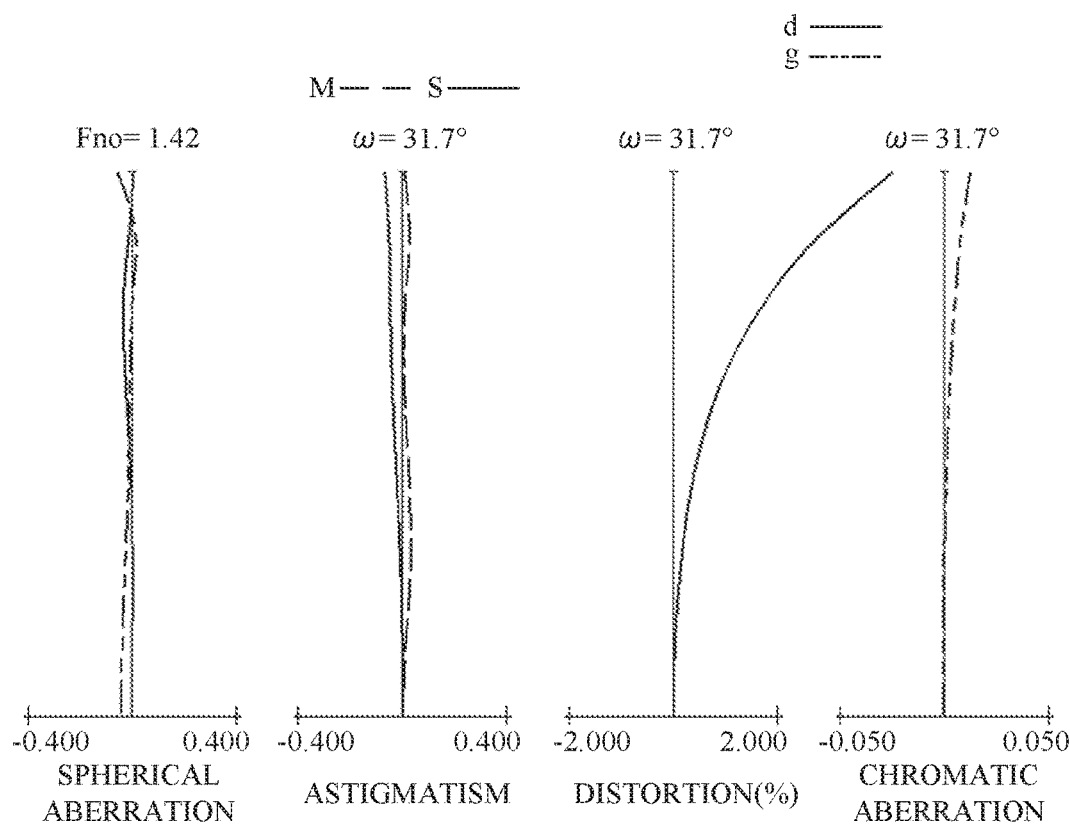
FIG. 11 is an aberrational diagram of the optical system according to Example 4 which is focused on the object at infinity.
Figure 12:
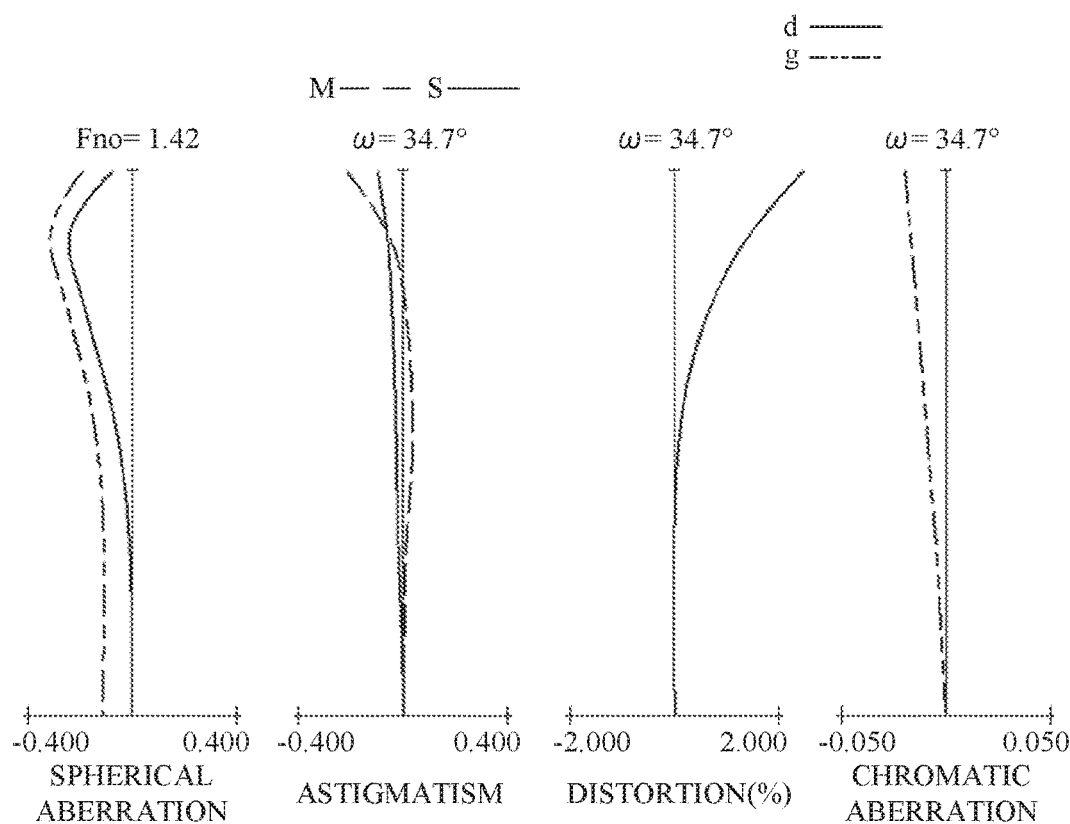
FIG. 12 is an aberrational diagram of an optical system according to Example 4 which is focused on a short distance object.
Figure 13:
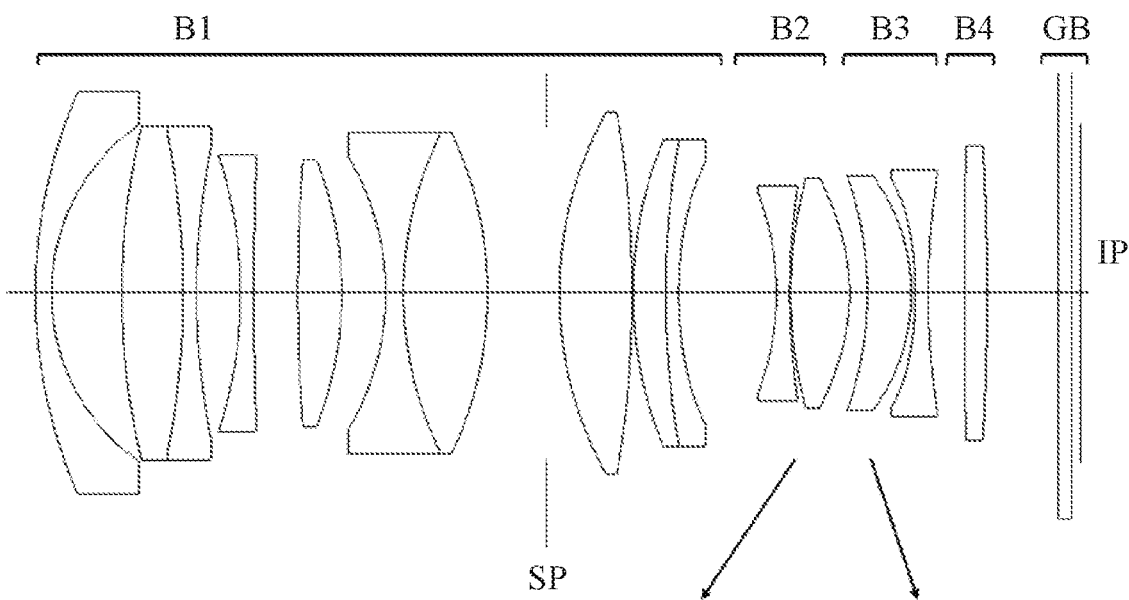
FIG. 13 is a sectional view of an optical system according to Example 5 which is focused on an object at infinity.
Figure 14:
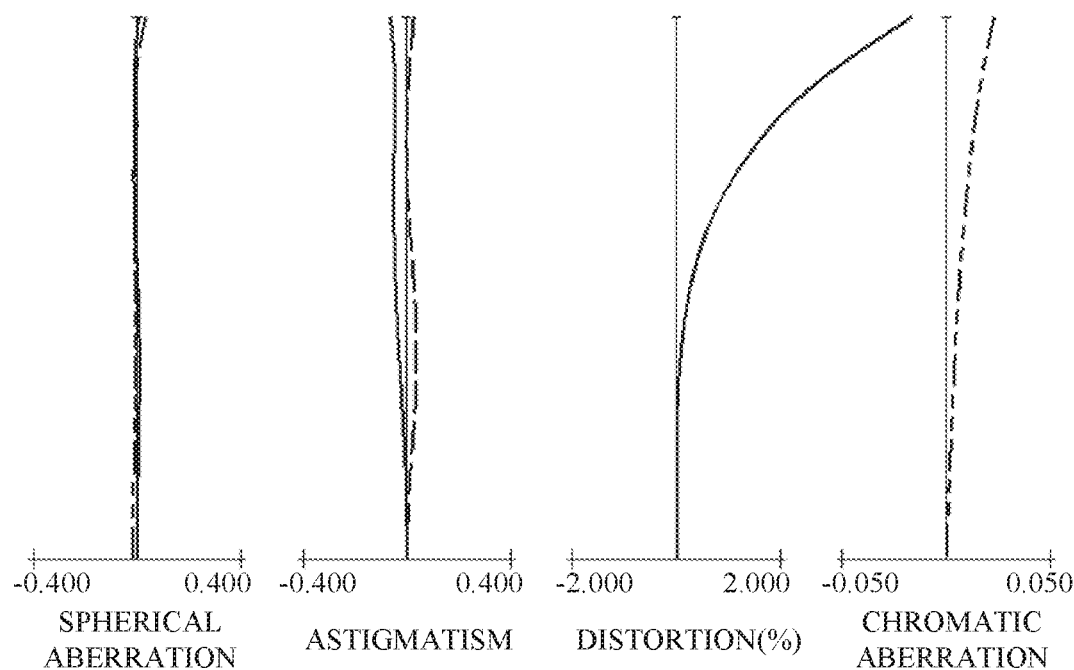
FIG. 14 is an aberrational diagram of the optical system according to Example 5 which is focused on the object at infinity.
Figure 15:
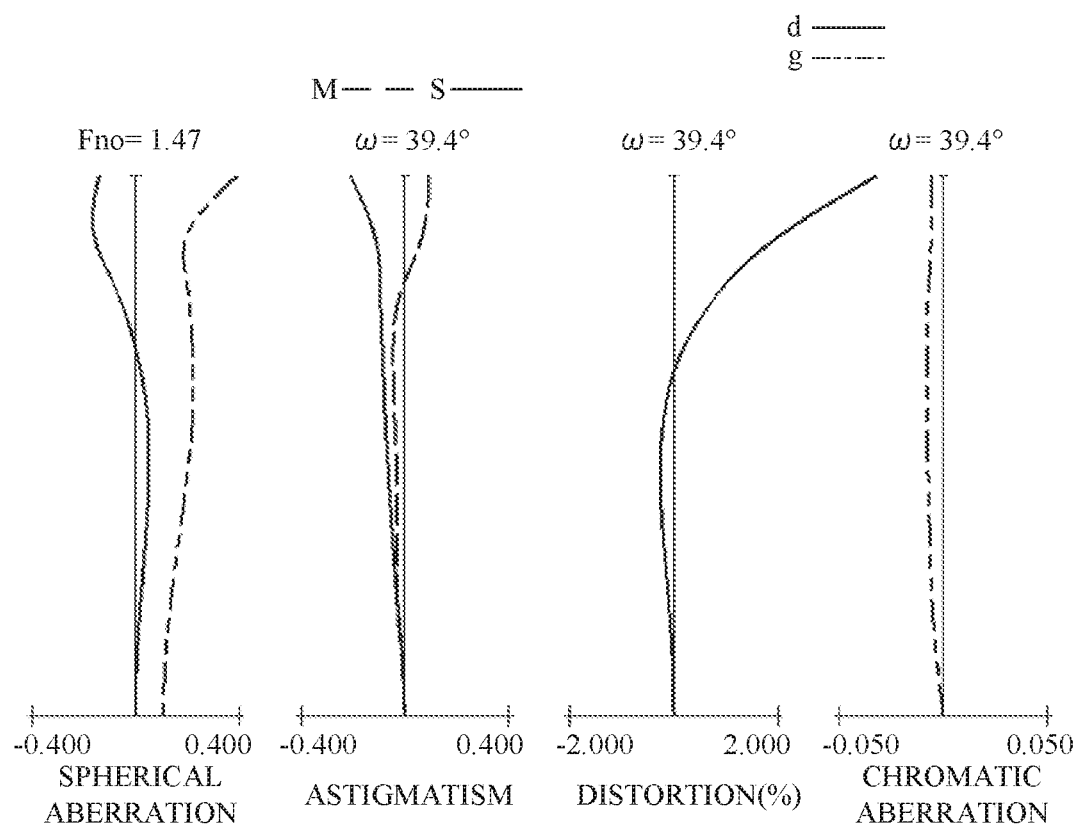
FIG. 15 is an aberrational diagram of an optical system according to Example 5 which is focused on a short distance object.
Figure 16:
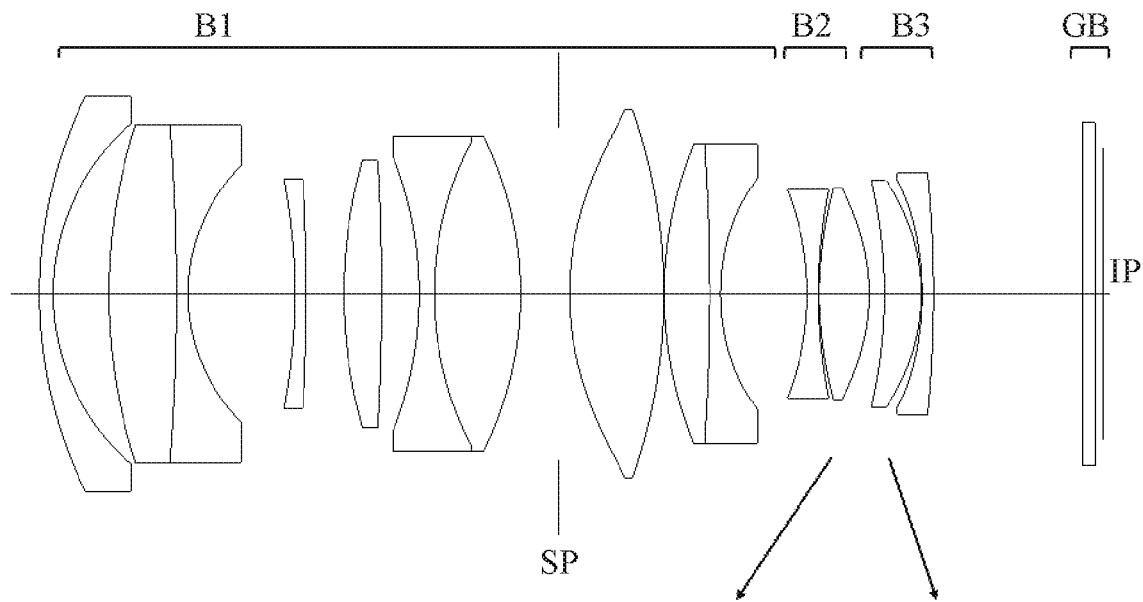
FIG. 16 is a sectional view of an optical system according to Example 6 which is focused on an object at infinity.
Figure 17:
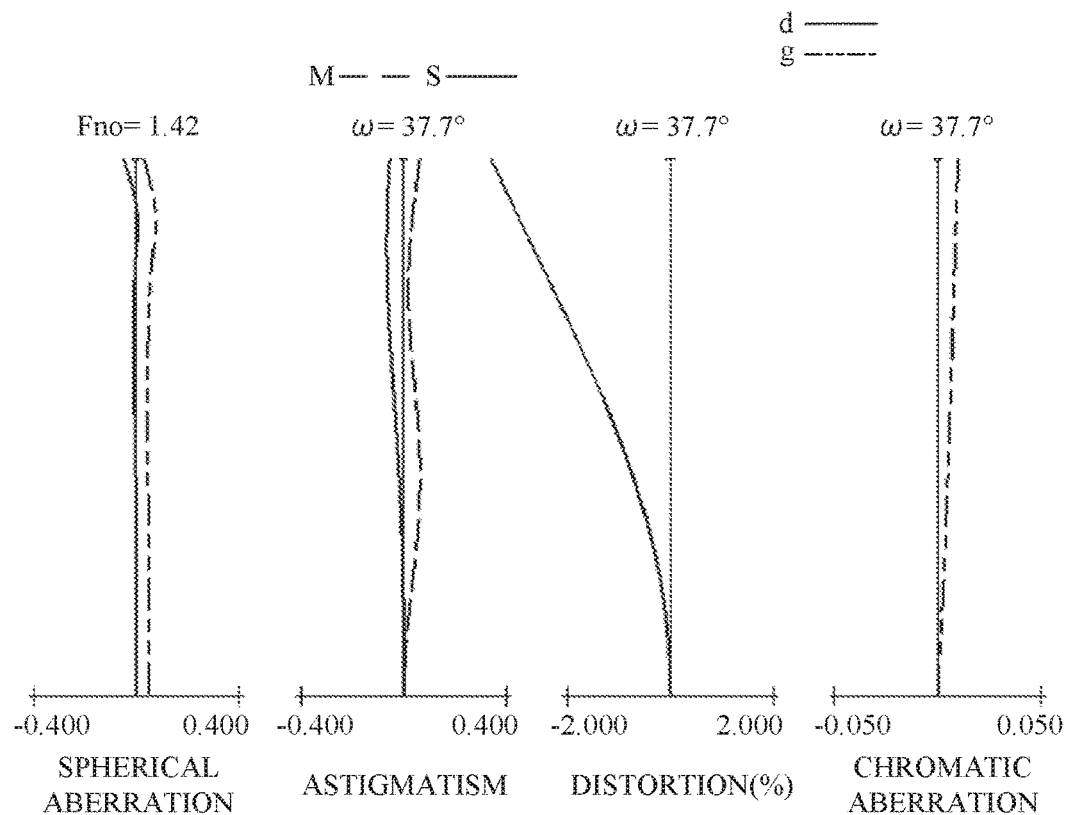
FIG. 17 is an aberrational diagram of the optical system according to Example 6 which is focused on the object at infinity.
Figure 18:
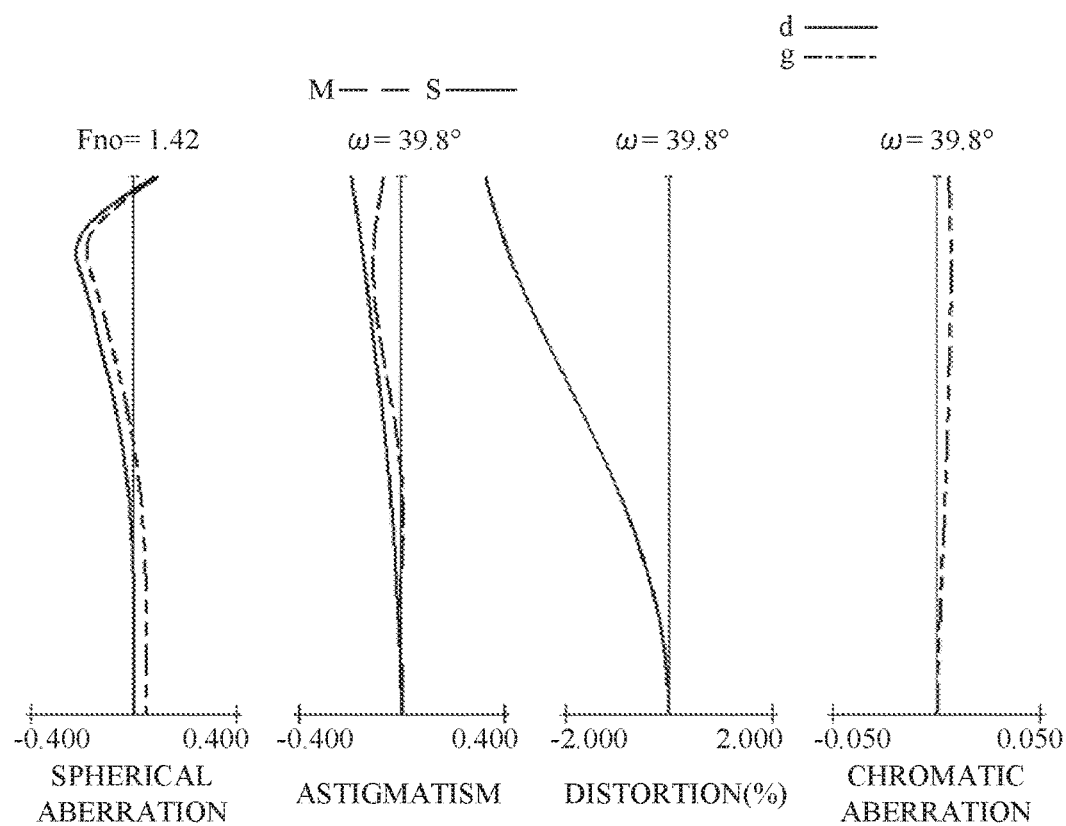
FIG. 18 is an aberrational diagram of an optical system according to Example 6 which is focused on a short distance object.
Figure 19:
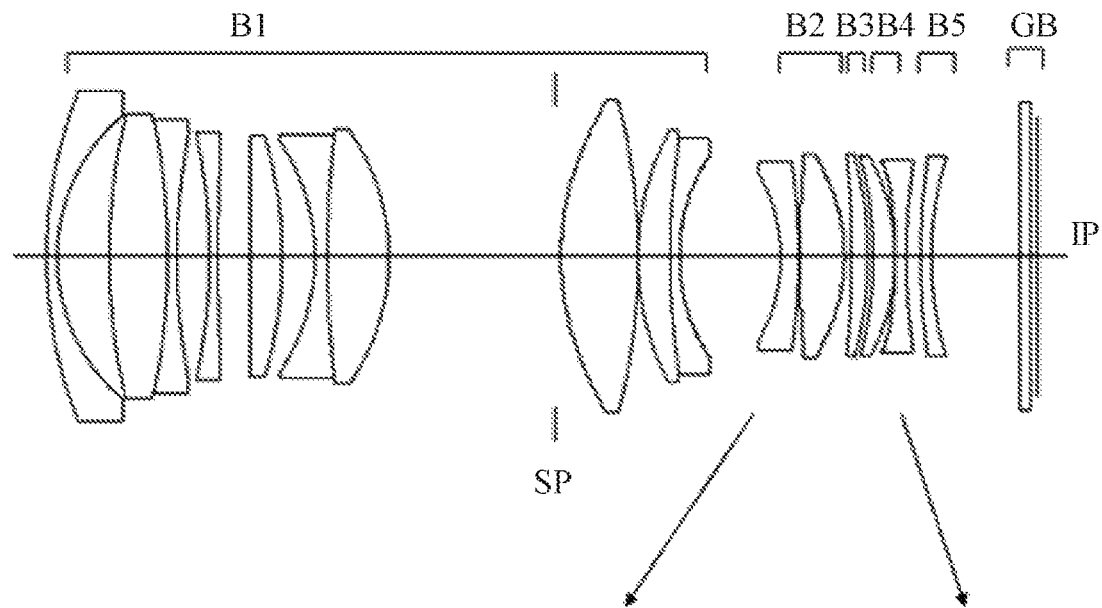
FIG. 19 is a sectional view of an optical system according to Example 7 which is focused on an object at infinity.
Figure 20:
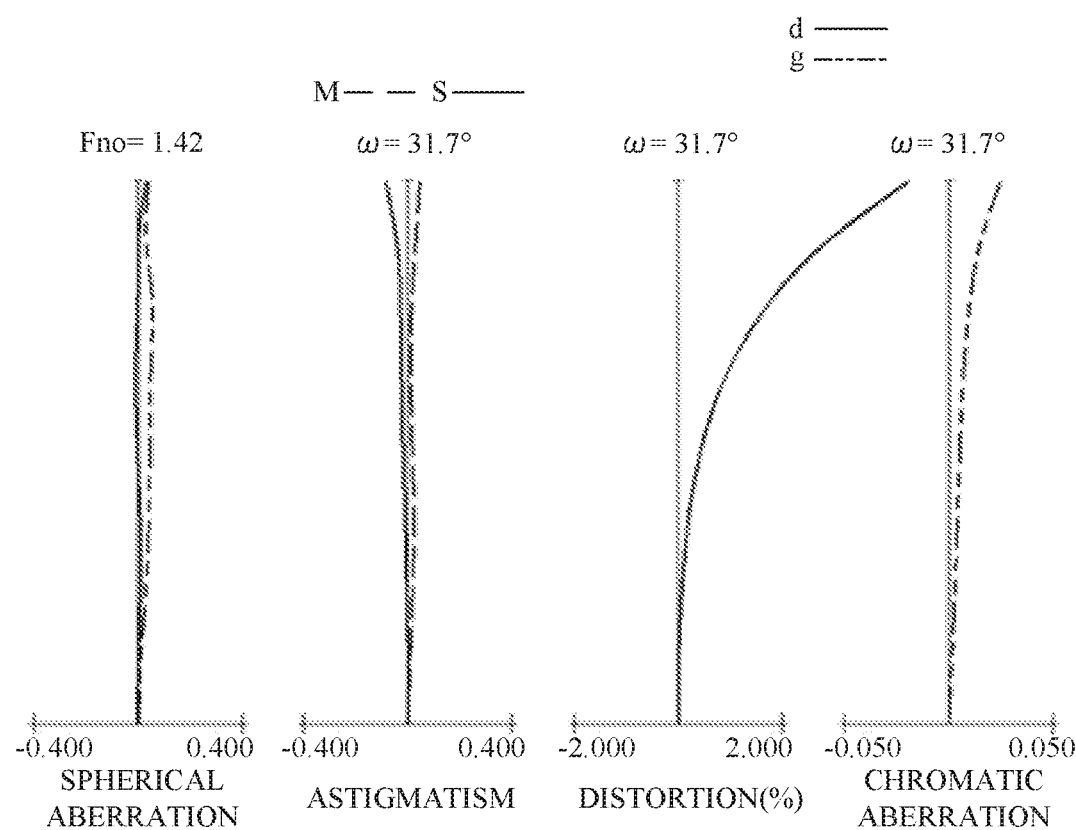
FIG. 20 is an aberrational diagram of the optical system according to Example 7 which is focused on the object at infinity.
Figure 21:
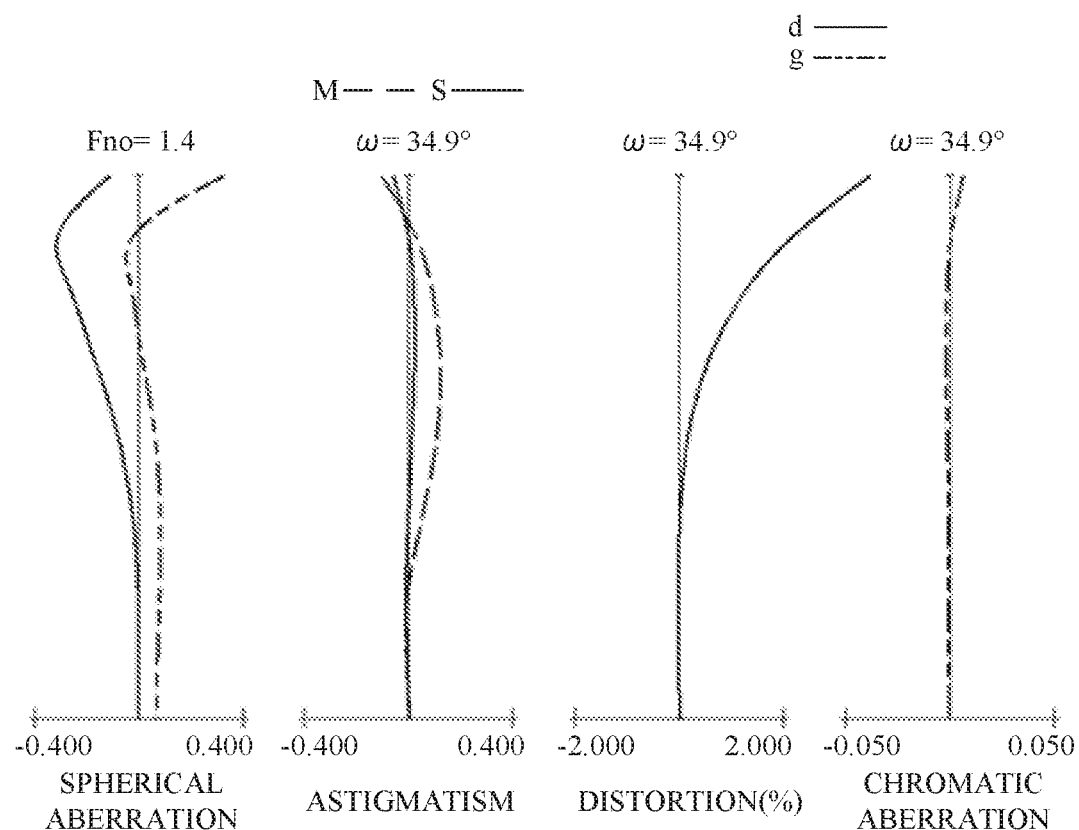
FIG. 21 is an aberrational diagram of an optical system according to Example 7 which is focused on a short distance object.

Referring now to the accompanying drawings, a detailed description will be given of embodiments according to the present invention. Corresponding elements in respective figures will be designated by the same reference numerals, and a duplicate description thereof will be omitted.

FIGS. 1, 4, 7, 10, 13, 16, and 19 are sectional views of optical systems according to Examples 1 to 7 when focused on an object at infinity, respectively. The optical system according to each example is an optical system used in an image pickup apparatus, such as a digital video camera, a digital still camera, a broadcasting camera, a silver salt film camera, and a surveillance camera.

In each lens section, the left side represents the object side and the right side represents the image side. The optical system according to each example has a plurality of lens units. In the specification of the present application, a lens unit is a unit of lenses that move or stop integrally during focusing. In other words, in the optical system according to each example, a distance between adjacent lens units changes during focusing from infinity (an object at infinity) to a short distance (object). The lens unit may include one or more lenses. The lens unit may include an aperture stop.

The optical system according to each example includes a first lens unit having a positive refractive power disposed closest to the object, a first focus lens unit having a positive refractive power disposed on an image side of the first lens unit, and a second focus lens unit having a negative refractive power disposed on the image side of the focus lens unit.

In each lens sectional view, Bi represents an i-th lens unit (i is a natural number) counted from the object among the lens units included in the optical system.

SP represents a diaphragm (aperture stop). GB represents an optical block corresponding to an optical filter, a face plate, a low-pass filter, an infrared cutting filter, or the like. IP represents an image plane, and when the optical system according to each example is used as an imaging optical system of a digital still camera or a digital video camera, an imaging plane of a solid-state image sensor (photoelectric conversion element) such as a CCD sensor or a CMOS sensor is placed. When the optical system according to each example is used as an imaging optical system for a film-based camera, a photosensitive plane corresponding to the film plane is placed on the image plane IP.

In the optical system according to each example, the first lens unit is fixed (stationary or does not move) during focusing from infinity to the short distance, and the first focus lens unit and the second focus lens unit are movable during so that a distance between the first focus lens unit and the second focus lens unit changes. The arrow shown in each lens sectional view represents the moving direction of the lens unit during focusing from infinity to a short distance. The first focus lens unit and the second focus lens unit move on different trajectories during focusing.

FIGS. 2, 5, 8, 11, 14, 17, and 20 are aberrational diagrams according to Examples 1 to 7 when focused on an object at infinity, respectively. FIGS. 3, 6, 9, 12, 15, 18, and 21 are aberrational diagrams according to Examples 1 to 7 when focused on the short distance object.

In the spherical aberrational diagram. Fno represents an F-number, and spherical aberration amounts for the d-line (wavelength 587.6 nm) and g-line (wavelength 435.8 nm). In an astigmatism diagram, M represents an astigmatism amount on a meridional image plane, and S represents an astigmatism amount on a sagittal image plane. In the distortion diagram, a distortion amount for the d-line is shown. A chromatic aberrational diagram shows a chromatic aberration amount for the g-line. ω is an imaging half angle of view (°).

Next follows a description of a characteristic configuration of the optical system according to each example.

In the optical system according to each example, the following conditional expressions (1) and (2) are satisfied:

$$-5.0 < fp2/fn1 < -0.1 \quad (1)$$

$$-0.50 < n1gt/fn1 < -0.04 \quad (2)$$

where fp2 is a focal length of the first focus lens unit, fn1 is a focal length of the second focus lens unit, and n1gt is a distance on an optical axis from a surface closest to an object to a surface closest to an image plane of the second focus lens unit.

The conditional expression (1) defines a ratio of a focal length of the first focus lens unit to a focal length of the second focus lens unit. If the value is higher than the upper limit of the conditional expression (1), the focal length of the first focus lens unit becomes too small and it is difficult to suppress the spherical aberration and curvature of field in the imaging range. If the focal length of the second focus lens unit becomes too large and the exit pupil position in the optical system comes too close to the image plane, it is difficult to secure the telecentricity in a supportable range of the electronic image sensor (solid-state image pickup element). On the other hand, if the value is lower than the lower limit, the focal length of the first focus lens unit becomes too large, and if an attempt is made to reduce an imaging distance during image capturing, a proper moving amount during focusing increases and high-speed focusing becomes difficult.

The conditional expression (2) defines a ratio of a distance on an optical axis from the surface closest to the object to the surface closest to the image plane of the second focus lens unit and the focal length of the second focus lens unit. If the value is higher than the upper limit of the conditional expression (2), the distance on the optical axis from the surface closest to the object to the surface closest to the image plane of the second focus lens unit becomes too small, and it becomes difficult to secure the edge thickness and axial thickness of each lens. On the other hand, if the value is lower than the lower limit, the distance on the optical axis from the surface closest to the object to the surface closest to the image plane of the second focus lens unit becomes too large, and the weight of the focus unit increases. Therefore, high-speed focusing requires a unit for driving the lens with a high output, and it is difficult to make compact the optical system.

The numerical range of the conditional expression (1) or (2) may be changed to that of the following conditional expression (1a) or (2a):

$$-4.25 < fp2 - fn1 < -0.34 \quad (1a)$$

$$-0.40 < n1gt/fn1 < -0.04 \quad (2a)$$

The numerical range of the conditional expression (1) or (2) may be set to that of the following conditional expression (1b) or (2b):

$$-3.49 < fp2/fn1 < -0.58 \quad (1b)$$

$$-0.29 < n1gt/fn1 < -0.04 \quad (2b)$$

An optical system that satisfies the following conditional expression (1)' also constitutes one aspect of the optical system according to the present invention.

$$-1.6 < fp2/fn1 < -0.8 \quad (1)'$$

In the optical system according to each example, the following expression (3) may be satisfied:

$$1 < |f/Mn2| < 15000 \quad (3)$$

where Mn2 is a moving amount of the second focus lens unit relative to the image plane during focusing from infinity to the shortest distance, and f is a focal length of the entire optical system.

The conditional expression (3) defines a ratio of the focal length of the entire optical system to the moving amount of the second focus lens unit relative to the image plane. If the value is higher than the upper limit of the conditional expression (3), the moving amount of the second focus lens unit relative to the image plane becomes too small during focusing from infinity to the shortest distance, and it becomes difficult to suppress the lateral chromatic aberration, the spherical aberration, and the coma of the optical system. On the other hand, if the value is lower than the lower limit, it becomes difficult to secure the moving amount of the second focus lens unit relative to the image plane during focusing from infinity to the shortest distance becomes too large, and if an attempt is made to reduce the imaging distance during imaging, it becomes difficult to secure a proper moving amount during focusing.

The optical systems according to each example may satisfy the following conditional expression (4):

$$-15.00 < fnr/f < -0.20 \quad (4)$$

where fnr is a combined focal length from the surface closest to the object of the second focus lens unit to the image plane when focused on the object at infinity.

The conditional expression (4) defines a ratio of the combined focal length from the surface closest to the object of the second focus lens unit to the image plane when focused on the object at infinity to the focal length of the entire optical system. If the value is higher than the upper limit of the conditional expression (4), the combined focal length from the surface closest to the object of the second focus lens unit to the image plane when focused on the object at infinity becomes too small. Therefore, if the exit pupil position in the optical system is too close to the image plane, it becomes difficult to secure the telecentricity in a supportable range of the electronic image sensor (solid-state image sensor). On the other hand, if the value is lower than the lower limit, the combined focal length from the surface closest to the object of the second focus lens unit to the image plane when focused on the object at infinity becomes too large. Thus, if an attempt is made to reduce the imaging distance during imaging, a proper moving amount during focusing increases and high-speed focusing becomes difficult.

The optical system according to each example may satisfy the following conditional expression (5):

$$0.05 < f/X1 < 3.00 \quad (5)$$

where X1 is a distance from the diaphragm to the image plane when focused on the object at infinity.

The conditional expression (5) defines a ratio of the focal length of the entire optical system to the distance from the diaphragm to the image plane when focused on the object at infinity. If the value is higher than the upper limit of the conditional expression (5), the distance from the diaphragm to the image plane when focused on the object at infinity and the focal length of the entire optical system become too small. Therefore, if the exit pupil position in the optical system is too close to the image plane, it becomes difficult to secure the telecentricity in a supportable range of the electronic image sensor (solid-state image sensor). On the other hand, if the value is lower than the lower limit, the distance from the diaphragm to the image plane when focused on the object at infinity and the focal length of the entire optical system become too large. Therefore, it becomes difficult to suppress the overall length of the optical system.

The optical system according to each example may satisfy the following conditional expression (6):

$$-10.00 < SFn1 < -0.05 \quad (6)$$

where SFn is a shape factor of the negative lens having the strongest negative refractive power among the negative lenses included in the second focus lens unit. The shape factor is an amount defined by the following expression:

$$SFn1 = (gn1nr1 + gn1nr2)/(gn1nr1 - gn1nr2)$$

where gn1nr1 is a radius of curvature of the surface on the object side of the negative lens having the strongest negative refractive power among the negative lenses included in the second focus lens unit, and gn1nr2 is a radius of curvature of surface on the image side of the negative lens having the strongest negative refractive power.

The conditional expression (6) defines the shape factor of the second focus lens unit. If the value is higher than the upper limit of the conditional expression (6), the radius of curvature on the image plane side of the second focus lens unit becomes too small and it becomes difficult to dispose an optical filter on the image side of the final lens plane. On the other hand, if the value is lower than the lower limit, the radius of curvature on the object side of the second focus lens unit becomes too large, and when the exit pupil position in the optical system becomes too close to the image plane, it becomes difficult to secure the telecentricity in the supportable range of an electronic image sensor (solid-state image pickup element).

In the optical system according to each example, the following conditional expression (7) may be satisfied:

$$0.05 < Dp/f < 2.00 \quad (7)$$

where Dp is a distance on the optical axis from the surface closest to the image plane of the first lens unit to the surface closest to the object of the first focus lens unit when focused on the object at infinity.

The conditional expression (7) defines a distance on the optical axis from the surface closest to the image plane of the first lens unit to the surface closest to the object of the first focus lens unit and the focal length of the entire optical system when focused on the object at infinity. If the value is higher than the upper limit of the conditional expression (7), the distance on the optical axis from the surface closest to the image plane of the first lens unit to the surface closest to the object of the first focus lens unit when focused on the object at infinity becomes too large, and it becomes difficult to suppress the overall length of the optical system. On the other hand, if the value is lower than the lower limit, the distance on the optical axis from surface closest to the image plane of the first lens unit to the surface closest to the object of the first focus lens unit when focused on the object at infinity becomes too small. Therefore, if an attempt is made to reduce the imaging distance during image capturing, it becomes difficult to secure a proper moving amount during focusing.

The optical system according to each example may satisfy the following conditional expression (8):

$$0.20 < \beta fn1 < 6.00 \tag{8}$$

where βfn1 is a lateral magnification of the second focus lens unit when focused on the object at infinity.

The conditional expression (8) defines the lateral magnification of the second focus lens unit. If the value is higher than the upper limit of the conditional expression (8), the lateral magnification of the second focus lens unit becomes too large, and it becomes difficult to suppress view angle changes during motion image capturing. On the other hand, if the value is lower than the lower limit and an attempt is made to reduce the imaging distance during image capturing, the proper moving amount increases during focusing and high-speed focusing becomes difficult.

In the optical system according to each example, the following conditional expression (9) may be satisfied:

$$0.20 < f/y < 10.00 \tag{9}$$

where y is a radius of an image circle.

The conditional expression (9) defines a properly set ratio of the focal length of the entire optical system to the radius of the image circle. If the value is higher than the upper limit of the conditional expression (9), it becomes difficult to obtain a desired angle of view. On the other hand, when the value is lower than the lower limit of the conditional expression (9), the focal length of the optical system becomes too short, the lateral chromatic aberration, the coma, and the curvature of field increase, and it becomes difficult to correct these various aberrations.

In the optical system according to each example, the following conditional expression (10) may be satisfied:

$$0.01 < Dfp/f < 0.50 \tag{10}$$

where Dfp is a distance on the optical axis from the surface closest to the image plane of the first focus lens unit to the surface closest to the object of the second focus lens unit when focused on the object at infinity.

The conditional expression (10) defines a ratio of distance on the optical axis from surface closest to the image plane of the first focus lens unit to the surface closest to the object of the second focus lens unit when focused on the object at infinity and the focal length of the entire optical system. If the value is higher than the upper limit of the conditional expression (10), the distance on the optical axis from the surface closest to the image plane of the first focus lens unit to the surface closest to the object of the second focus lens unit when focused on the object at infinity becomes too large, and it becomes difficult to suppress the overall length of the optical system. On the other hand, if the value is lower than the lower limit, the distance on the optical axis from the surface closest to the image plane of the first focus lens unit to the surface closest to the object of the second focus lens unit when focused on the object at infinity becomes too small. Therefore, if an attempt is made to reduce the imaging distance during image capturing, it becomes difficult to secure a proper moving amount during focusing.

In the optical system of each example, the following conditional expression (11) may be satisfied:

$$20 < |fa/f| < 1000 \tag{11}$$

where fa is a combined focal length from the surface closest to the object of the first focus lens unit to the surface closest to the image plane of the second focus lens unit when focused on the object at infinity.

The conditional expression (11) defines a ratio of the combined focal length from the surface closest to the object of the first focus lens unit to the surface closest to the image plane of the second focus lens unit and the focal length of the entire optical system. If the value is higher than the upper limit of the conditional expression (11), the combined focal length from the surface closest to the object of the first focus lens unit to the surface closet to the image plane of the second focus lens unit becomes too large. Therefore, if an attempt is made to reduce the imaging distance during image capturing, a proper moving amount during focusing increases, high-speed focusing becomes difficult. On the other hand, if the value is lower than the lower limit, the combined focal length from the surface closest to the object of the first focus lens unit to the surface closet to the image plane of the second focus lens unit becomes too small, and it becomes difficult to suppress the spherical aberration and curvature of field in the imaging range.

In the optical system according to each example, the following conditional expression (12) may be satisfied:

$$0.20 < di/f < 10.00 \tag{12}$$

where di is a distance on the optical axis from the surface closest to the image plane of the first lens unit to the image plane during focusing on the object at infinity.

The conditional expression (12) defines a ratio of the distance on the optical axis from the surface closest to the image plane of the first lens unit to the image plane and the focal length of the entire optical system. If the value is higher than the upper limit of the conditional expression (12), the distance on the optical axis from the surface closest to the image plane of the first lens unit to the image plane becomes too large, and it becomes difficult to suppress the overall length of the optical system. On the other hand, if the value is lower than the lower limit and the exit pupil position in the optical system comes too close to the image plane, it becomes difficult to secure the telecentricity in a supportable range of the electronic image pickup apparatus (solid-state image pickup element).

The numerical ranges of the conditional expressions (3) to (12) may be changed to those of the following conditional expressions (3a) to (12a):

$$1.95 < |f/Mn2| < 11200.00 \tag{3a}$$

$$-11.72 < fnr/f < -0.50 \tag{4a}$$

$$0.16 < f/X1 < 2.21 \tag{5a}$$

$$-7.23 < SFn1 < -0.07 \tag{6a}$$

$$0.15 < Dp/f < 0.49 \tag{7a}$$

$$0.59 < \beta fn1 < 4.00 \tag{8a}$$

$$0.53 < f/y < 4.49 \quad (9a)$$

$$0.03 < Dfp/f < 0.38 \quad (10a)$$

$$0.78 < |fa/f| < 750.00 \quad (11a)$$

$$0.54 < di/f < 7.28 \quad (12a)$$

The numerical ranges of conditional expressions (3) to (12) may be set to those of the following conditional expression (3b) or (2b):

$$2.90 < |f/Mn2| < 7500.00 \quad (3b)$$

$$-8.43 < fnr/f < -0.79 \quad (4b)$$

$$0.27 < f/X1 < 1.41 \quad (5b)$$

$$-4.46 < SFn1 < -0.08 \quad (6b)$$

$$0.24 < Dp/f < 0.98 \quad (7b)$$

$$0.86 < \beta fn1 < 2.88 \quad (8b)$$

$$0.93 < f/y < 4.42 \quad (9b)$$

$$0.04 < Dfp/f < 0.26 \quad (10b)$$

$$0.88 < |fa/f| < 300.00 \quad (11b)$$

$$0.90 < di/f < 4.50 \quad (12b)$$

The optical system according to each example may correct the distortion and lateral chromatic aberration among various aberrations by electrical image processing. Thereby, the overall lens diameter can be made compact, the imaging magnification can be made larger and the chromatic aberration, the curvature of field, etc. can be properly corrected in imaging at the shortest distance in the optical system.

Next, the optical system according to each example will be described in detail.

Each of the optical systems according to Examples 1 to 3 and 6 includes, in order from the object side to the image side, a first lens unit B1 having a positive refractive power and a second lens unit B2 having a positive refractive power as a first focus lens unit, and a third lens unit B3 having a negative refractive power as a second focus lens unit. The first lens unit B1 does not move during focusing from infinity to a short distance, and the second lens unit B2 and the third lens unit B3 are moved to the object side and the image side, respectively.

The optical system according to Example 4 includes, in order from the object side to the image side, a first lens unit B having a positive refractive power, a second lens unit B2 having a positive refractive power as a first focus lens unit, a third lens unit B3 having a negative refractive power as a second focus lens unit, and a fourth lens unit B4 having a negative refractive power. The first lens unit B1 and the fourth lens unit B4 do not move during focusing from infinity to a short distance, and the second lens unit B2 and the third lens unit B3 are moved to the object side.

The optical system according to Example 5 includes, in order from the object side to the image side, a first lens unit B1 having a positive refractive power, a second lens unit B2 having a positive refractive power as a first focus lens unit, a third lens unit B3 having a negative refractive power as a second focus lens unit, and a fourth lens unit B4 has a positive refractive power. The first lens unit B1 and the fourth lens unit B4 do not move during focusing from infinity to a short distance, and the second lens unit B2 and the third lens unit B3 are moved to the object side and the image side, respectively.

By disposing a fixed unit having a positive or negative refractive power as in Examples 4 and 5, it is possible to further suppress view angle changes in capturing a motion image.

The optical system according to Example 7 includes, in order from the object side to the image side, a first lens unit B having a positive refractive power, a second lens unit B2 having a positive refractive power as a first focus lens unit, a third lens unit B3 having a refractive power, a fourth lens unit B4 having a negative refractive power as a second focus lens unit, and a fifth lens unit B5 having a negative refractive power. When focused from infinity to a short distance, the first lens unit B1, the third lens unit B3, and the fifth lens unit B5 are fixed, and the second lens unit B2 and the fourth lens unit B4 are moved to the object side and the image side, respectively.

Numerical Examples 1 to 7 corresponding to the Examples 1 to 7 are shown below.

In the surface data in each numerical example, r represents a radius of curvature of each optical surface, and d (mm) represents an axial distance (distance on the optical axis) between an m-th surface and an (m+1)-th surface, where m is the number of the surface counted from the light incident side. nd represents a refractive index of each optical element for the d-line, and vd represents an Abbe number of the optical element. The Abbe number vd of a certain material is expressed as follows where Nd, NF, and NC are refractive indexes for the d-line (587.6 nm), the F-line (486.1 nm), and the C-line (656.3 nm) in the Fraunhofer line:

$$vd = (Nd-1)/(NF-NC)$$

In each numerical example, all values of d, focal length f (mm) F-number, and half angle of view (degree) are set when the optical system in each example focuses on the object at infinity. The "backfocus" is a distance on the optical axis from the final lens surface (the lens surface closest to the image plane) to the paraxial image plane in terms of the air-converted length. The "overall lens length" is a length obtained by adding the backfocus to the distance on the optical axis from the forefront surface (the lens surface closest to the object) to the final surface in the optical system. The "lens unit" may include a plurality of lenses or only a single lens.

When the optical surface is an aspherical surface, the symbol * is added to the right shoulder of the surface number. The aspherical shape is expressed as follows:

$$X = (h^2/R)/[1+\{1-(1+k)(h/R)^2\}^{1/2}] + A4 \times h^4 + A6 \times h^6 + A8 \times h^8 + A10 \times h^{10}$$

where X is a displacement amount from the surface vertex in the optical axis direction, h is a height from the optical axis in the direction orthogonal to the optical axis, R is a paraxial radius of curvature, k is a conical constant, A4, A6, A8, and A10 are aspherical coefficients of each order. "e±XX" in each aspherical surface coefficient means "$\times 10^{\pm XX}$".

Numerical Example 1

| UNIT mm | | | | |
|---|---|---|---|---|
| Surface data | | | | |
| surface number | r | d | nd | vd |
| 1 | 209.285 | 1.80 | 1.61602 | 61.9 |
| 2 | 30.000 | 5.43 | | |
| 3 | 66.538 | 8.76 | 2.00100 | 29.1 |
| 4 | −99.347 | 1.50 | 1.63624 | 26.7 |
| 5 | 103.440 | 5.00 | | |
| 6 | −96.421 | 1.50 | 1.58457 | 31.1 |
| 7 | 91.325 | 5.00 | | |
| 8 | 72.037 | 5.00 | 1.77076 | 46.6 |
| 9 | −415.399 | 5.00 | | |
| 10 | −36.664 | 2.00 | 1.61272 | 29.5 |
| 11 | 52.878 | 8.70 | 1.72763 | 54.7 |
| 12 | −48.216 | 5.00 | | |
| 13(diaphragm) | ∞ | 1.50 | | |
| 14* | 29.908 | 8.16 | 1.73020 | 54.4 |
| 15 | −535.120 | 0.10 | | |
| 16 | 49.840 | 4.70 | 1.95906 | 17.5 |
| 17 | −211.981 | 1.50 | 1.86326 | 22.1 |
| 18* | 30.000 | (variable) | | |
| 19 | −23.761 | 1.50 | 1.72387 | 25.6 |
| 20 | −196.275 | 0.10 | | |
| 21* | 107.513 | 6.54 | 1.79872 | 42.7 |
| 22* | −24.651 | (variable) | | |
| 23 | −44.747 | 4.45 | 1.44023 | 89.7 |
| 24 | −22.869 | 0.53 | | |
| 25* | −32.794 | 1.50 | 2.00100 | 29.1 |
| 26 | −200.000 | (variable) | | |
| 27 | ∞ | 1.60 | 1.51633 | 64.1 |
| 28 | ∞ | 1.00 | | |
| image plane | ∞ | | | |

| ASPHERIC DATA |
|---|
| fourteenth surface |

K = 0.00000e+000 A 4 = 2.12947e−006 A 6 = −8.16034e−010 A 8 = 3.35328e−012
A10 = −1.45070e−014 eighteenth surface

K = 0.00000e+000 A 4 = 1.20960e−005 A 6 = 1.61249e−008 A 8 = 1.56392e−010 twenty-first surface

K = 0.00000e+000 A 4 = −2.86484e−006 A 6 = 3.12263e−008 twenty-second surface

K = 0.00000e+000 A 4 = 1.48443e−005 A 6 = 6.99081e−009 A 8 = 9.72512e−011 twenty-fifth surface

K = 9.06819e−001 A 4 = −6.61308e−006 A 6 = −8.38243e−010 A 8 = −7.61710e−011

| VARIOUS DATA | |
|---|---|
| Focal length | 35.00 |
| F-NUMBER | 1.42 |
| Half angle of view (degree) | 31.72 |
| Image height | 21.64 |
| overall lens length | 112.71 |
| BF | 13.62 |

| | infinity | short distance |
|---|---|---|
| d18 | 11.84 | 8.37 |
| d22 | 2.00 | 8.61 |
| d26 | 11.56 | 8.42 |

| LENS UNIT DATA | | |
|---|---|---|
| Unit | Starting surface | Focal length |
| 1 | 1 | 33.71 |
| 2 | 19 | 60.41 |
| 3 | 23 | −62.17 |

-continued

| UNIT mm | | |
|---|---|---|
| Lens | Starting surface | Focal length |
| SINGLE LENS DATA | | |
| 1 | 2 | −57.067 |
| 2 | 4 | 40.889 |
| 3 | 5 | −79.420 |
| 4 | 7 | −79.998 |
| 5 | 9 | 80.007 |
| 6 | 11 | −35.039 |
| 7 | 12 | 35.965 |
| 8 | 15 | 239.028 |
| 9 | 17 | 42.448 |
| 10 | 18 | −30.356 |
| 11 | 20 | −37.482 |
| 12 | 22 | 25.671 |
| 13 | 24 | 100.040 |
| 14 | 26 | −39.364 |
| Cemented lens data | | |
| 1 | 3 | 77.929 |
| 2 | 10 | 497.038 |
| 3 | 16 | −136.642 |

Numerical Example 2

| UNIT mm | | | | |
|---|---|---|---|---|
| Surface data | | | | |
| surface number | r | d | nd | vd |
| 1 | 393.973 | 1.80 | 1.76146 | 26.7 |
| 2 | 30.000 | 4.41 | | |
| 3 | 57.234 | 9.00 | 2.00070 | 26.5 |
| 4 | −104.060 | 1.50 | 1.52585 | 72.5 |
| 5 | 103.589 | 5.00 | | |
| 6 | −93.404 | 1.50 | 1.63578 | 26.8 |
| 7 | 95.714 | 5.00 | | |
| 8 | 59.637 | 5.00 | 1.71691 | 55.3 |
| 9 | −1450.385 | 5.00 | | |
| 10 | −36.652 | 2.00 | 1.61431 | 30.7 |
| 11 | 66.957 | 9.03 | 1.71319 | 55.5 |
| 12 | −46.814 | 5.00 | | |
| 13(diaphragm) | ∞ | 1.50 | | |
| 14* | 32.143 | 9.23 | 1.75174 | 49.8 |
| 15 | −240.936 | 0.10 | | |
| 16 | 39.770 | 3.66 | 1.95906 | 17.5 |
| 17 | 76.257 | 1.50 | 1.86401 | 24.2 |
| 18* | 30.000 | (variable) | | |
| 19 | −27.809 | 1.50 | 1.86215 | 24.2 |
| 20 | 1178.548 | 0.10 | | |
| 21* | 72.545 | 6.87 | 1.72916 | 54.7 |
| 22* | −23.987 | (variable) | | |
| 23 | −41.194 | 5.00 | 1.43855 | 92.4 |
| 24 | −22.027 | 0.73 | | |
| 25* | −29.463 | 1.50 | 2.00100 | 29.1 |
| 26 | −195.679 | (variable) | | |
| 27 | ∞ | 1.60 | 1.51633 | 64.1 |
| 28 | ∞ | 1.00 | | |
| image plane | ∞ | | | |
| ASPHERIC DATA | | | | | fourteenth surface

K = 0.00000e+000 A 4 = 1.37890e−006 A 6 = −9.06512e−010 A 8 = −1.68467e−013
A10 = −8.20139e−015
eighteenth surface K = 0.00000e+000 A 4 = 9.15855e−006 A 6 = 1.25831e−008 A 8 = 1.12976e−010
twenty-first surface

-continued

| UNIT mm |
| --- |
| K = 0.00000e+000 A 4 = −7.22718e−006 A 6 = 4.44789e−008 |
| twenty-second surface |
| K = 0.00000e+000 A 4 = 1.39011e−005 A 6 = 8.18237e−009 A 8 = 1.22363e−010 |
| twenty-fifth surface |
| K = 1.73774e+000 A 4 = −8.53680e−007 A 6 = −3.99618e−010 A 8 = −1.10778e−012 |

| VARIOUS DATA | |
| --- | --- |
| Focal length | 35.00 |
| F-NUMBER | 1.42 |
| Half angle of view (degree) | 31.72 |
| Image height | 21.64 |
| overall lens length | 113.32 |
| BF | 12.86 |

| | infinity | short distance |
| --- | --- | --- |
| d18 | 12.53 | 8.57 |
| d22 | 2.00 | 9.66 |
| d26 | 10.80 | 7.10 |

LENS UNIT DATA

| Unit | Starting surface | Focal length |
| --- | --- | --- |
| 1 | 1 | 29.49 |
| 2 | 19 | 80.51 |
| 3 | 23 | −50.97 |

SINGLE LENS DATA

| Lens | Starting surface | Focal length |
| --- | --- | --- |
| 1 | 2 | −42.737 |
| 2 | 4 | 37.958 |
| 3 | 5 | −98.476 |
| 4 | 7 | −74.125 |
| 5 | 9 | 80.011 |
| 6 | 11 | −38.277 |
| 7 | 12 | 39.951 |
| 8 | 15 | 38.281 |
| 9 | 17 | 82.612 |
| 10 | 18 | −58.114 |
| 11 | 20 | −31.494 |
| 12 | 22 | 25.487 |
| 13 | 24 | 100.000 |
| 14 | 26 | −34.807 |

Cemented lens data

| Lens | Starting surface | Focal length |
| --- | --- | --- |
| 1 | 3 | 58.411 |
| 2 | 10 | 657.095 |
| 3 | 16 | −247.088 |

Numerical Example 3

| UNIT mm | | | |
| --- | --- | --- | --- |
| Surface data | | | |
| surface number | r | d | nd | vd |
| --- | --- | --- | --- | --- |
| 1 | 127.381 | 1.80 | 1.59655 | 63.7 |
| 2 | 27.966 | 5.93 | | |
| 3 | 71.846 | 8.57 | 2.00090 | 28.4 |
| 4 | −99.476 | 1.50 | 1.62153 | 27.8 |
| 5 | 100.600 | 5.00 | | |
| 6 | −80.000 | 1.50 | 1.59042 | 30.5 |
| 7 | 116.123 | 5.00 | | |

-continued

UNIT mm

| | | | | |
|---|---|---|---|---|
| 8 | 98.356 | 5.00 | 1.77416 | 46.0 |
| 9 | −163.549 | 5.00 | | |
| 10 | −38.279 | 2.00 | 1.61159 | 28.8 |
| 11 | 50.205 | 8.66 | 1.72950 | 54.6 |
| 12 | −48.242 | 5.00 | | |
| 13(diaphragm) | ∞ | 1.50 | | |
| 14* | 31.021 | 7.98 | 1.72916 | 54.7 |
| 15 | −433.173 | 0.10 | | |
| 16 | 50.169 | 4.54 | 1.95906 | 17.5 |
| 17 | −287.517 | 1.50 | 1.86334 | 23.8 |
| 18* | 29.408 | (variable) | | |
| 19 | −23.235 | 1.50 | 1.70634 | 23.1 |
| 20 | −218.967 | 0.10 | | |
| 21* | 117.247 | 6.46 | 1.82583 | 39.7 |
| 22* | −24.940 | (variable) | | |
| 23 | −45.009 | 4.90 | 1.44171 | 87.9 |
| 24 | −23.041 | 0.33 | | |
| 25* | −35.162 | 1.50 | 2.00100 | 29.1 |
| 26 | −200.000 | (variable) | | |
| 27 | ∞ | 1.60 | 1.51633 | 64.2 |
| 28 | ∞ | 1.00 | | |
| image plane | ∞ | | | |

ASPHERIC DATA fourteenth surface

K = 0.00000e+000 A 4 = 2.20851e−006 A 6 = 4.36996e−011 A 8 = 1.89636e−012
A10 = −1.14969e−014
eighteenth surface K = 0.00000e+000 A 4 = 1.04852e−005 A 6 = 1.54221e−008 A 8 = 1.42616e−010
twenty-first surface K = 0.00000e+000 A 4 = −3.13712e−006 A 6 = 2.68864e−008
twenty-second surface K = 0.00000e+000 A 4 = 1.33639e−005 A 6 = 3.62501e−009 A 8 = 9.04413e−011
twenty-fifth surface K = 9.06819e−001 A 4 = −7.09774e−006 A 6 = −4.38224e−009 A 8 = −6.51962e−011

VARIOUS DATA

| | |
|---|---|
| Focal length | 34.99 |
| F-NUMBER | 1.42 |
| Half angle of view (degree) | 31.73 |
| Image height | 21.64 |
| overall lens length | 113.68 |
| BF | 14.51 |

| | infinity | short distance |
|---|---|---|
| d18 | 11.80 | 8.45 |
| d22 | 2.00 | 8.69 |
| d26 | 12.45 | 9.11 |

LENS UNIT DATA

| Unit | Starting surface | Focal length |
|---|---|---|
| 1 | 1 | 34.54 |
| 2 | 19 | 60.34 |
| 3 | 23 | −70.92 |

SINGLE LENS DATA

| Lens | Starting surface | Focal length |
|---|---|---|
| 1 | 1 | −60.476 |
| 2 | 3 | 42.748 |
| 3 | 4 | −80.245 |
| 4 | 6 | −80.000 |
| 5 | 8 | 80.003 |
| 6 | 10 | −35.211 |
| 7 | 11 | 35.024 |
| 8 | 14 | 39.991 |

-continued

| UNIT mm | | |
|---|---|---|
| 9 | 16 | 44.834 |
| 10 | 17 | −30.834 |
| 11 | 19 | −36.917 |
| 12 | 21 | 25.425 |
| 13 | 23 | 100.035 |
| 14 | 25 | −42.815 |

| Cemented lens data | | |
|---|---|---|
| Lens | Starting surface | Focal length |
| 1 | 3 | 84.689 |
| 2 | 10 | 348.706 |
| 3 | 16 | −122.508 |

Numerical Example 4

| UNIT mm | | | | |
|---|---|---|---|---|
| Surface data | | | | |
| surface number | r | d | nd | vd |
| 1 | 96.481 | 1.80 | 1.56104 | 67.5 |
| 2 | 27.165 | 7.96 | | |
| 3 | 85.118 | 6.37 | 1.98382 | 23.2 |
| 4 | −79.575 | 1.50 | 1.70805 | 23.1 |
| 5 | 200.000 | 5.00 | | |
| 6 | −53.905 | 1.50 | 1.75783 | 21.3 |
| 7 | 4005.431 | 5.00 | | |
| 8 | −346.838 | 5.00 | 1.81350 | 41.0 |
| 9 | −55.152 | 7.79 | | |
| 10 | −35.679 | 2.00 | 1.60804 | 34.7 |
| 11 | 57.096 | 8.94 | 1.72164 | 55.0 |
| 12 | −48.302 | 5.00 | | |
| 13(diaphragm) | ∞ | 1.50 | | |
| 14* | 38.259 | 7.90 | 1.72916 | 54.7 |
| 15 | −297.694 | 0.10 | | |
| 16 | 41.058 | 2.51 | 1.95906 | 17.5 |
| 17 | 46.349 | 1.50 | 1.95097 | 23.6 |
| 18* | 36.525 | (variable) | | |
| 19 | −24.299 | 1.92 | 1.79648 | 23.4 |
| 20 | −334.890 | 0.10 | | |
| 21* | 96.418 | 7.00 | 1.89042 | 34.5 |
| 22* | −25.452 | (variable) | | |
| 23 | −46.469 | 6.00 | 1.48874 | 79.6 |
| 24 | −27.438 | 0.10 | | |
| 25* | −62.014 | 1.50 | 2.00090 | 28.6 |
| 26 | 168.826 | (variable) | | |
| 27 | −69.131 | 2.00 | 1.99637 | 28.1 |
| 28 | −99.997 | 9.00 | | |
| 29 | ∞ | 1.60 | 1.51633 | 64.1 |
| 30 | ∞ | 1.00 | | |
| image plane | ∞ | | | |

ASPHERIC DATA fourteenth surface

K = 6.97036e−002 A 4 = 2.89112e−006 A 6 = 1.10152e−009 A 8 = 4.71797e−012
A10 = −8.51459e−015
eighteenth surface K = −2.19174e−001 A 4 = 4.88411e−006 A 6 = 8.32575e−009 A 8 = 3.36589e−011
A10 = 6.01223e−014
twenty-first surface K = 0.00000e+000 A 4 = −4.89034e−006 A 6 = 2.32513e−008 A 8 = −3.72112e−011
A10 = 3.61493e−014

-continued

| UNIT mm |
|---| twenty-second surface

K = 0.00000e+000 A 4 = 1.13629e−005 A 6 = 2.14897e−009 A 8 = 2.60152e−011
twenty-fifth surface K = 9.06819e−001 A 4 = −1.12883e−005 A 6 = −1.68567e−008 A 8 = −5.89874e−011

| VARIOUS DATA | |
|---|---|
| Focal length | 34.99 |
| F-NUMBER | 1.42 |
| Half angle of view (degree) | 31.73 |
| Image height | 21.64 |
| overall lens length | 121.14 |
| BF | 11.05 |

| | infinity | short distance |
|---|---|---|
| d18 | 13.68 | 9.16 |
| d22 | 2.00 | 6.51 |
| d26 | 4.41 | 4.42 |

| LENS UNIT DATA | | |
|---|---|---|
| Unit | Starting surface | Focal length |
| 1 | 1 | 32.90 |
| 2 | 19 | 54.73 |
| 3 | 23 | −66.78 |
| 4 | 27 | −232.29 |

| SINGLE LENS DATA | | |
|---|---|---|
| Lens | Starting surface | Focal length |
| 1 | 2 | −68.030 |
| 2 | 4 | 42.621 |
| 3 | 5 | −80.220 |
| 4 | 7 | −70.176 |
| 5 | 9 | 80.000 |
| 6 | 11 | −35.820 |
| 7 | 12 | 37.596 |
| 8 | 15 | 46.960 |
| 9 | 17 | 304.301 |
| 10 | 18 | −195.781 |
| 11 | 20 | −32.985 |
| 12 | 22 | 23.244 |
| 13 | 24 | 124.229 |
| 14 | 26 | −45.167 |
| 15 | 28 | −232.288 |

| Cemented lens data | | |
|---|---|---|
| Lens | Starting surface | Focal length |
| 1 | 3 | 86.710 |
| 2 | 10 | 708.537 |
| 3 | 16 | −623.925 |

Numerical Example 5

| UNIT mm | | | |
|---|---|---|---|
| Surface data | | | |
| surface number | r | d | nd | vd |
| 1 | 56.772 | 1.80 | 1.71041 | 55.6 |
| 2 | 23.445 | 7.97 | | |
| 3 | 80.052 | 7.00 | 1.97812 | 20.7 |
| 4 | −91.817 | 1.50 | 1.46389 | 85.9 |
| 5 | 83.691 | 5.00 | | |
| 6 | −51.011 | 1.50 | 1.94940 | 17.6 |

-continued

| UNIT mm | | | | |
|---|---|---|---|---|
| 7 | 397.798 | 5.00 | | |
| 8 | 186.914 | 5.00 | 1.60775 | 62.6 |
| 9 | −41.420 | 5.00 | | |
| 10 | −30.248 | 2.00 | 1.69693 | 25.9 |
| 11 | 41.069 | 9.55 | 1.69288 | 56.6 |
| 12 | −42.903 | 6.66 | | |
| 13(diaphragm) | ∞ | 1.50 | | |
| 14* | 43.640 | 8.25 | 1.88228 | 35.0 |
| 15 | −122.545 | 0.10 | | |
| 16 | 45.533 | 3.69 | 1.95906 | 17.5 |
| 17 | 100.008 | 1.50 | 1.65793 | 25.4 |
| 18* | 43.930 | (variable) | | |
| 19 | −32.245 | 1.50 | 1.92906 | 25.1 |
| 20 | 78.496 | 0.10 | | |
| 21* | 46.560 | 6.72 | 1.72593 | 54.8 |
| 22* | −23.958 | (variable) | | |
| 23 | −39.656 | 5.00 | 1.43819 | 93.0 |
| 24 | −22.433 | 0.43 | | |
| 25* | −45.673 | 1.50 | 2.00060 | 25.4 |
| 26 | 91.627 | (variable) | | |
| 27 | 753.042 | 2.59 | 1.96208 | 30.7 |
| 28 | −302.228 | 8.00 | | |
| 29 | ∞ | 1.60 | 1.51633 | 64.1 |
| 30 | ∞ | 1.00 | | |
| image plane | ∞ | | | |

ASPHERIC DATA fourteenth surface

K = 9.283916−002 A 4 = 8.27582e−007 A 6 = 7.09585e−010 A 8 = −2.64801e−012
A10 = −1.16284e−015
eighteenth surface K = 2.37691e−001 A 4 = 2.73588e−006 A 6 = 1.43754e−008 A 8 = 2.84857e−011
A10 = 6.70147e−014
twenty-first surface K = 0.00000e+000 A 4 = −1.28021e−005 A 6 = 6.10660e−008
twenty-second surface K = 0.000000e+000 A 4 = 1.28337e−005 A 6 = −3.06971e−010 A 8 = 1.53618e−010
twenty-fifth surface K = 7.52713e+000 A 4 = −1.00934e−005 A 6 = −1.25447e−008 A 8 = −3.40004e−011
A10 = −1.53878e−013

VARIOUS DATA

| | |
|---|---|
| Focal length | 29.26 |
| F-NUMBER | 1.42 |
| Half angle of view (degree) | 36.48 |
| Image height | 21.64 |
| overall lens length | 118.08 |
| BF | 10.05 |

| | infinity | short distance |
|---|---|---|
| d18 | 11.09 | 7.79 |
| d22 | 2.00 | 7.55 |
| d26 | 4.07 | 1.82 |

LENS UNIT DATA

| Unit | Starting surface | Focal length |
|---|---|---|
| 1 | 1 | 22.01 |
| 2 | 19 | 109.51 |
| 3 | 23 | −40.27 |
| 4 | 27 | 224.44 |

SINGLE LENS DATA

| Lens | Starting surface | Focal length |
|---|---|---|
| 1 | 1 | −57.509 |
| 2 | 3 | 44.622 |

-continued

| UNIT mm | | |
|---|---|---|
| 3 | 4 | −94.127 |
| 4 | 6 | −47.545 |
| 5 | 8 | 56.256 |
| 6 | 10 | −24.709 |
| 7 | 11 | 31.763 |
| 8 | 14 | 37.343 |
| 9 | 16 | 84.362 |
| 10 | 17 | −120.351 |
| 11 | 19 | −24.442 |
| 12 | 21 | 22.700 |
| 13 | 23 | 108.297 |
| 14 | 25 | −30.296 |
| 15 | 27 | 224.440 |

| Cemented lens data | | |
|---|---|---|
| Lens | Starting surface | Focal length |
| 1 | 3 | 80.818 |
| 2 | 10 | −225.020 |
| 3 | 16 | 247.842 |

Numerical Example 6

| UNIT mm | | | | |
|---|---|---|---|---|
| Surface data | | | | |
| surface number | r | d | nd | vd |
| 1 | 59.989 | 1.80 | 1.95906 | 17.5 |
| 2 | 30.006 | 7.40 | | |
| 3 | 73.542 | 9.00 | 1.97859 | 20.6 |
| 4 | −290.519 | 1.50 | 1.47106 | 83.9 |
| 5 | 24.194 | 14.19 | | |
| 6 | −80.000 | 1.50 | 1.67128 | 57.8 |
| 7 | −266.628 | 5.00 | | |
| 8 | 64.626 | 5.00 | 1.58055 | 31.5 |
| 9 | −313.228 | 5.00 | | |
| 10 | −49.719 | 2.00 | 1.67038 | 26.9 |
| 11 | 44.135 | 11.45 | 1.56508 | 67.1 |
| 12 | −47.302 | 5.00 | | |
| 13(diaphragm) | ∞ | 1.50 | | |
| 14* | 38.787 | 12.51 | 1.72714 | 54.8 |
| 15 | −74.529 | 0.10 | | |
| 16 | 52.873 | 5.98 | 1.95906 | 17.5 |
| 17 | −278.535 | 1.50 | 1.69634 | 24.6 |
| 18* | 30.000 | (variable) | | |
| 19 | −37.873 | 1.50 | 1.86551 | 23.6 |
| 20 | 71.699 | 0.10 | | |
| 21* | 50.125 | 6.63 | 1.64778 | 59.4 |
| 22* | −27.059 | (variable) | | |
| 23 | −65.534 | 4.90 | 1.46434 | 85.8 |
| 24 | −26.751 | 0.10 | | |
| 25* | −42.638 | 1.50 | 1.98653 | 22.1 |
| 26 | −169.152 | (variable) | | |
| 27 | ∞ | 1.60 | 1.51633 | 64.2 |
| 28 | ∞ | 1.00 | | |
| image plane | ∞ | | | |

ASPHERIC DATA fourteenth surface

K = 0.00000e+000 A 4 = −1.51782e−006 A 6 = −2.48754e−009 A 8 = −2.86357e−012 A10 = 2.08832e−015
eighteenth surface K = 0.00000e+000 A 4 = 6.93613e−006 A 6 = 1.36289e−008 A 8 = 3.73232e−011

| UNIT mm |
|---| twenty-first surface

K = 0.00000e+000 A 4 = −6.58830e−006 A 6 = 1.57407e−008
twenty-second surface

K = 0.00000e+000 A 4 = 8.01595e−006 A 6 = −8.05336e−009 A 8 = 5.03912e−011
twenty-fifth surface K = 9.06819e−001 A 4 = −4.80133e−006 A 6 = −6.31428e−009 A 8 = −2.28939e−011

| VARIOUS DATA | |
|---|---|
| Focal length | 28.00 |
| F-NUMBER | 1.42 |
| Half angle of view (degree) | 37.69 |
| Image height | 21.64 |
| overall lens length | 140.62 |
| BF | 21.99 |

| | infinity | short distance |
|---|---|---|
| d18 | 11.47 | 8.15 |
| d22 | 2.00 | 12.58 |
| d26 | 19.93 | 12.67 |

| LENS UNIT DATA | | |
|---|---|---|
| Unit | Starting surface | Focal length |
| 1 | 19 | 23.65 |
| 2 | 19 | 215.63 |
| 3 | 23 | −143.77 |

| SINGLE LENS DATA | | |
|---|---|---|
| Lens | Starting surface | Focal length |
| 1 | 1 | −64.494 |
| 2 | 3 | 60.713 |
| 3 | 4 | −47.340 |
| 4 | 6 | −170.813 |
| 5 | 8 | 92.730 |
| 6 | 10 | −34.581 |
| 7 | 11 | 42.317 |
| 8 | 14 | 36.794 |
| 9 | 16 | 46.748 |
| 10 | 17 | −38.816 |
| 11 | 19 | −28.452 |
| 12 | 21 | 28.076 |
| 13 | 23 | 93.596 |
| 14 | 25 | −58.129 |

| Cemented lens data | | |
|---|---|---|
| Lens | Starting surface | Focal length |
| 1 | 3 | −328.178 |
| 2 | 10 | −420.485 |
| 3 | 16 | −399.256 |

Numerical Example 7

| UNIT mm | | | | |
|---|---|---|---|---|
| Surface data | | | | |
| surface number | r | d | nd | vd |
| 1 | 67.449 | 1.80 | 1.68358 | 57.1 |
| 2 | 28.221 | 8.33 | | |
| 3 | 96.540 | 8.89 | 1.99684 | 24.5 |
| 4 | −102.080 | 1.50 | 1.67605 | 57.5 |
| 5 | 99.143 | 5.00 | | |

-continued

| UNIT mm | | | | |
|---|---|---|---|---|
| 6 | −90.277 | 1.50 | 1.95906 | 17.5 |
| 7 | 514.789 | 5.00 | | |
| 8 | 22960.745 | 5.00 | 1.79759 | 42.8 |
| 9 | −63.988 | 5.00 | | |
| 10 | −32.071 | 2.00 | 1.70638 | 29.4 |
| 11 | 157.991 | 9.75 | 1.59616 | 63.7 |
| 12 | −33.862 | 25.84 | | |
| 13(diaphragm) | ∞ | 1.00 | | |
| 14* | 41.562 | 11.81 | 1.72916 | 54.7 |
| 15 | −95.765 | 0.10 | | |
| 16 | 40.619 | 5.10 | 1.95906 | 17.5 |
| 17 | 114.670 | 1.50 | 1.99879 | 25.9 |
| 18* | 30.000 | (variable) | | |
| 19 | −25.852 | 2.84 | 1.79684 | 20.3 |
| 20 | −91.273 | 0.10 | | |
| 21* | 173.979 | 7.00 | 1.72916 | 54.7 |
| 22* | −25.987 | (variable) | | |
| 23 | −178.318 | 2.50 | 1.69931 | 56.2 |
| 24 | −59.740 | (variable) | | |
| 25 | −58.367 | 3.31 | 1.43905 | 91.6 |
| 26 | −32.197 | 0.05 | | |
| 27* | −82.503 | 1.50 | 2.00080 | 26.7 |
| 28 | 100.837 | (variable) | | |
| 29 | 106.587 | 1.50 | 1.92446 | 32.5 |
| 30 | 50.959 | 14.11 | | |
| 31 | ∞ | 1.60 | 1.51633 | 64.1 |
| 32 | ∞ | 1.00 | | |
| image plane | ∞ | | | |

ASPHERIC DATA fourteenth surface $K = 0.00000e+000$ $A\,4 = −7.03552e−007$ $A\,6 = −1.30963e−009$ $A\,8 = −1.62727e−012$
$A10 = 6.39993e−016$
eighteenth surface $K = 0.00000e+000$ $A\,4 = 3.58432e−006$ $A\,6 = 4.49747e−009$ $A\,8 = 1.82768e−011$
twenty-first surface $K = 0.00000e+000$ $A\,4 = −1.74935e−006$ $A\,6 = 1.01690e−008$
twenty-second surface $K = 0.00000e+000$ $A\,4 = 1.11204e−005$ $A\,6 = −5.64019e−009$ $A\,8 = 4.10298e−011$
twenty-seventh surface $K = 9.06819e−001$ $A\,4 = −9.33448e−006$ $A\,6 = −1.57371e−008$ $A\,8 = −1.04393e−011$

VARIOUS DATA

| | |
|---|---|
| Focal length | 34.98 |
| F-NUMBER | 1.42 |
| Half angle of view (degree) | 31.73 |
| Image height | 21.64 |
| overall lens length | 154.45 |
| BF | 16.17 |

| | infinity | short distance |
|---|---|---|
| d18 | 15.86 | 11.28 |
| d22 | 1.00 | 5.58 |
| d24 | 1.00 | 2.20 |
| d28 | 2.50 | 1.30 |
| d32 | 1.00 | −2.67 |

LENS UNIT DATA

| Unit | Starting surface | Focal length |
|---|---|---|
| 1 | 1 | 33.34 |
| 2 | 19 | 70.51 |
| 3 | 23 | 127.36 |
| 4 | 25 | −62.02 |
| 5 | 29 | −107.01 |

-continued

| | UNIT mm | |
|---|---|---|
| | SINGLE LENS DATA | |
| Lens | Starting surface | Focal length |
| 1 | 1 | −72.33092 |
| 2 | 3 | 50.91110 |
| 3 | 4 | −74.17223 |
| 4 | 6 | −79.98914 |
| 5 | 8 | 80.01209 |
| 6 | 10 | −37.57691 |
| 7 | 11 | 47.68007 |
| 8 | 14 | 41.24486 |
| 9 | 16 | 63.44492 |
| 10 | 17 | −41.04210 |
| 11 | 19 | −46.15019 |
| 12 | 21 | 31.47251 |
| 13 | 23 | 127.36142 |
| 14 | 25 | 157.47837 |
| 15 | 27 | −45.15576 |
| 16 | 29 | −107.00614 |
| | Cemented lens data | |
| Lens | Starting surface | Focal length |
| 1 | 3 | 144.93664 |
| 2 | 10 | −447.53501 |
| 3 | 16 | −148.98411 |

Table 1 below summarizes various values in each numerical example.

TABLE 1

| | | Example | | | | | | |
|---|---|---|---|---|---|---|---|---|
| | | 1 | 2 | 3 | 4 | 5 | 6 | 7 |
| Conditional Expression | (1) fp2/fn1 | −0.972 | −1.580 | −0.851 | −0.820 | −2.720 | −1.500 | −1.137 |
| | (2) n1gt/fn1 | −0.104 | −0.142 | −0.095 | −0.114 | −0.172 | −0.045 | −0.078 |
| | (3) \|f/Mn2\| | 11.146 | 8.458 | 10.476 | 3498.000 | 13.004 | 3.857 | 15.547 |
| | (4) fnr/f | −1.776 | −1.456 | −2.027 | −1.456 | −1.741 | −5.135 | −1.088 |
| | (5) f/X1 | 0.598 | 0.587 | 0.590 | 0.548 | 0.483 | 0.387 | 0.464 |
| | (6) SFn1 | −1.392 | −1.355 | −1.427 | −0.463 | −0.335 | −1.674 | −0.100 |
| | (7) Dp/f | 0.338 | 0.358 | 0.337 | 0.381 | 0.379 | 0.410 | 0.453 |
| | (8) θfn1 | 1.260 | 1.301 | 1.249 | 1.283 | 1.441 | 1.185 | 1.304 |
| | (9) f/y | 1.617 | 1.617 | 1.617 | 1.617 | 1.352 | 1.294 | 1.616 |
| | (10) Dfp/f | 0.057 | 0.057 | 0.057 | 0.057 | 0.062 | 0.071 | 0.129 |
| | (11) \|fa/f\| | 248.417 | 3.421 | 15.588 | 11.181 | 1.931 | 11.771 | 4.755 |
| | (12) di/f | 1.217 | 1.247 | 1.247 | 1.438 | 1.558 | 1.812 | 1.597 |

Image Pickup Apparatus

Figure 22:
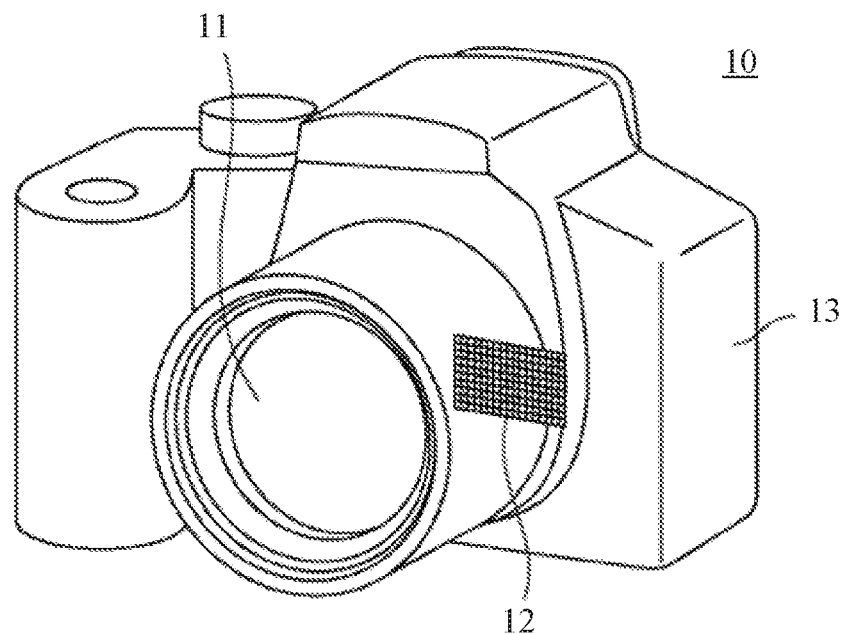
FIG. 22 is a schematic diagram of an image pickup apparatus.

Referring now to FIG. 22, a description will be given of an embodiment of a digital still camera (image pickup apparatus) that uses the optical system of the present invention for the imaging optical system. In FIG. 22, reference numeral 10 denotes a camera body, and reference numeral 11 denotes the imaging optical system configured by any of the optical systems described according to Examples 1 to 7. Reference numeral 12 denotes a solid-state image sensor (photoelectric conversion element) such as a CCD sensor or a CMOS sensor which is built in the camera body, receives an optical image formed by the imaging optical system 11, and photoelectrically converts it. The camera body 10 may be a so-called single lens reflex camera having a quick turn mirror or a so-called mirrorless camera having no quick turn mirror.

Applying the optical system according to the present invention to the image pickup apparatus, such as a digital still camera, can provide an image pickup apparatus having a compact lens.

Image Pickup System

An imaging system (surveillance camera system) including the optical system according to each example and a controller that controls the optical system may be configured. In this case, the controller can control the optical system so that each lens unit moves as described above during zooming, focusing, and image stabilizing. At this time, the controller does not have to be integrated with the optical system, and may be configured as a separate member from the optical system. For example, a controller (control apparatus) disposed far from a driver that drives each lens in the optical system includes a transmitter that sends a control signal (command) for controlling the optical system. With this controller, the optical system can be remotely operated.

By providing to the controller an operation unit, such as a control device and buttons, for remotely controlling the optical system, the optical system may be controlled according to an input to the operation unit by the user. For example, a scaling-up button and a scaling-down button may be provided as the operation unit in order to send a signal from the controller to the driver in the optical system so that the magnification of the optical system increases as the user presses the scaling-up button and the magnification of the optical system decreases as the user presses the scaling-down button.

The image pickup system may include a display unit, such as a liquid crystal panel, for displaying information (moving state of a focus lens) on the in-focus position of the optical system. The information on the in-focus position of the optical system includes, for example, an object distance. In this case, the user can remotely control the optical system via the operation unit while viewing the information on the in-focus position of the optical system displayed on the display unit. At this time, the display unit and the operation unit may be integrated with each other, for example, through a touch panel.

Each of the above examples can provide an optical system, an image pickup apparatus, and an image pickup system, each of which can correct aberrations over a wide object distance range, while making compact the focus unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-190192, filed on Oct. 17, 2019, which is hereby incorporated by reference herein in its entirety.

What is claimed is:

1. An optical system comprising a first lens unit having a positive refractive power disposed closest to an object, a first focus lens unit having a positive refractive power disposed on an image side of the first lens unit, and a second focus lens unit having a negative refractive power disposed on the image side of the first focus lens unit, the first lens unit being fixed for focusing, and the first focus lens unit and the second focus lens unit being movable during focusing so that a distance between the first focus lens unit and the second focus lens unit changes, wherein the first lens unit includes a single negative lens disposed closest to the object, wherein the first lens unit includes an aperture stop and a plurality of positive lenses which are disposed on the image side of the aperture stop, and wherein the following inequalities are satisfied:

$-5.0 < fp2/fn1 < -0.1$ $-0.290 < n1gt/fn1 < -0.095$ where fp2 is a focal length of the first focus lens unit, fn1 is a focal length of the second focus lens unit, and n1gt is a distance on an optical axis from a surface closest to the object of the second focus lens unit to a surface closest to an image plane of the second focus lens unit.

2. The optical system according to claim 1, wherein the following inequality is satisfied:

$1 < |f/Mn2| < 15000$ where Mn2 is a moving amount of the second focus lens unit relative to the image plane during focusing from infinity to a shortest distance, and f is a focal length of the optical system.

3. The optical system according to claim 1, wherein the following inequality is satisfied:

$-15.00 < fnr/f < -0.20$ where fnr is a combined focal length from the surface closest to the object of the second focus lens unit to the image plane when focused on the object at infinity and f is a focal length of the optical system.

4. The optical system according to claim 1, further comprising a diaphragm, wherein the following inequality is satisfied:

$0.05 < f/X1 < 3.00$ where X1 is a distance from the diaphragm to the image plane when focused on the object at infinity, and f is a focal length of the optical system.

5. The optical system according to claim 1, wherein the following inequality is satisfied:

$-10.00 < SFn1 < -0.05$ where SFn is a shape factor of a negative lens having a strongest negative refractive power among negative lenses included in the second focus lens unit.

6. The optical system according to claim 1, wherein the following inequality is satisfied:

$0.05 < Dp/f < 2.00$ where Dp is a distance on the optical axis from a surface closest to the image plane of the first lens unit to a surface closest to the object of the first focus lens unit when focused on the object at infinity, and f is a focal length of the optical system.

7. The optical system according to claim 1, wherein the following inequality is satisfied:

$0.20 < \beta fn1 < 6.00$ where βfn1 is a lateral magnification of the second focus lens unit when focused on the object at infinity.

8. The optical system according to claim 1, wherein the following inequality is satisfied:

$0.20 < f/y < 10.00$ where y is a radius of an image circle, and f is a focal length of the optical system.

9. The optical system according to claim 1, wherein the following inequality is satisfied:

$0.01 < Dfp/f < 0.50$ where Dfp is a distance on the optical axis from a surface closest to the image plane of the first focus lens unit to the surface closest to the object of the second focus lens unit when focused on the object at infinity, and f is a focal length of the optical system.

10. The optical system according to claim 1, wherein the following inequality is satisfied:

$0.20 < |fa/f| < 1000$ where fa is a combined focal length of optical elements between a surface closest to the object of the first focus lens unit and the surface closest to the image plane of the second focus lens unit when focused the object at infinity, and f is a focal length of the optical system.

11. The optical system according to claim 1, wherein the following inequality is satisfied:

$0.20 < di/f < 10.00$ where di is a distance on the optical axis from a surface closest to the image plane of the first lens unit to the image plane when focused on the object at infinity, and f is a focal length of the optical system.

12. The optical system according to claim 1, wherein the optical system includes, in order from an object side to the image side, the first lens unit, the first focus lens unit serving as a second lens unit, and the second focus lens unit serving as a third lens unit.

13. The optical system according to claim 1, wherein the optical system includes, in order from an object side to the image side, the first lens unit, the first focus lens unit serving as a second lens unit, the second focus lens unit serving as a third lens unit, and a fourth lens unit having a positive or negative refractive power, the fourth lens unit being fixed during focusing.

14. The optical system according to claim 1, wherein the optical system includes, in order from an object side to the image side, the first lens unit, the first focus lens unit serving as a second lens unit, a third lens unit having a positive refractive power, the second focus lens unit serving as a fourth lens unit, and a fifth lens unit having a negative refractive power, the third lens and the fifth lens unit being fixed during focusing.

15. The optical system according to claim 1, wherein the second focus lens unit includes a positive lens disposed closest to the object in the second focus lens unit, and a negative lens adjacently disposed on the image side of the positive lens.

16. The optical system according to claim 1, wherein the first focus lens unit includes a negative lens disposed closest to the object in the first focus lens unit and having a concave lens surface on an object side.

17. The optical system according to claim 1, wherein lenses arranged adjacent to the aperture stop on an object side and the image side of the aperture stop are positive lenses.

18. The optical system according to claim 1, wherein the first lens unit has a positive lens, a positive lens, and a negative lens which are arranged in order from the aperture stop to the image side.

19. The optical system according to claim 1, wherein the second focus lens unit includes a positive lens and a negative lens.

20. The optical system according to claim 1, wherein the first lens unit includes a negative lens disposed on the image side of the aperture stop and having a concave surface on the image side.

21. The optical system according to claim 1, wherein the following inequality is satisfied:

$$-2.027 \leq fnr/f < -0.790$$

where fnr is a combined focal length from the surface closest to the object of the second focus lens unit to the image plane when focused on the object at infinity and f is a focal length of the optical system.

22. The optical system according to claim 1, wherein the following inequality is satisfied: $-5.000 < fp2/fn1 < -0.820$.

23. The optical system according to claim 1, wherein the following inequality is satisfied: $-2.720 < fp2/fn1 < -0.820$.

24. The optical system according to claim 1,
wherein the first lens unit includes a cemented lens constituted of a negative lens and a positive lens adjacently disposed on an image side of the negative lens, and
wherein the cemented lens is adjacently disposed on an object side of the aperture stop.

25. The optical system according to claim 1, wherein the first lens unit includes three biconcave lenses.

26. An image pickup apparatus comprising:
an optical system comprising a first lens unit having a positive refractive power disposed closest to an object, a first focus lens unit having a positive refractive power disposed on an image side of the first lens unit, and a second focus lens unit having a negative refractive power disposed on the image side of the first focus lens unit, the first lens unit being fixed for focusing, and the first focus lens unit and the second focus lens unit being movable during focusing so that a distance between the first focus lens unit and the second focus lens unit changes; and
an image sensor configured to receive light of an image formed by the optical system,
wherein the first lens unit includes a single negative lens disposed closest to the object,
wherein the first lens unit includes an aperture stop and a plurality of positive lenses which are disposed on the image side of the aperture stop, and
wherein the following inequalities are satisfied:

$$-5.0 < fp2/fn1 < -0.1$$

$$-0.290 < n1gt/fn1 < -0.095$$

where fp2 is a focal length of the first focus lens unit, fn1 is a focal length of the second focus lens unit, and n1gt is a distance on an optical axis from a surface closest to the object of the second focus lens unit to a surface closest to an image plane of the second focus lens unit.

* * * * *